United States Patent
Dai et al.

(10) Patent No.: US 12,212,506 B2
(45) Date of Patent: Jan. 28, 2025

(54) PDCCH WITH PREEMPTION INDICATION

(71) Applicant: QUALCOMM Incorporated, San Diego, CA (US)

(72) Inventors: Jing Dai, Beijing (CN); Chao Wei, Beijing (CN); Jing Lei, San Diego, CA (US); Qiaoyu Li, Beijing (CN); Min Huang, Beijing (CN); Hao Xu, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 368 days.

(21) Appl. No.: 17/759,301

(22) PCT Filed: Feb. 14, 2020

(86) PCT No.: PCT/CN2020/075207
§ 371 (c)(1),
(2) Date: Jul. 22, 2022

(87) PCT Pub. No.: WO2021/159443
PCT Pub. Date: Aug. 19, 2021

(65) Prior Publication Data
US 2023/0058058 A1    Feb. 23, 2023

(51) Int. Cl.
*H04L 12/00*    (2006.01)
*H04L 5/00*    (2006.01)
(Continued)

(52) U.S. Cl.
CPC ......... *H04L 5/0012* (2013.01); *H04W 72/044* (2013.01); *H04W 72/23* (2023.01)

(58) Field of Classification Search
CPC ... H04L 5/0012; H04L 5/0053; H04L 5/0064; H04L 5/0092; H04L 5/0094; H04L 5/001;
(Continued)

(56) References Cited

U.S. PATENT DOCUMENTS 11,606,799 B2 *   3/2023   Yang .................. H04W 72/542
2019/0132824 A1    5/2019   Jeon et al.
(Continued)

FOREIGN PATENT DOCUMENTS

CN    109462892 A    3/2019
CN    110771083 A    2/2020
(Continued)

OTHER PUBLICATIONS

International Search Report and Written Opinion—PCT/CN2020/075207—ISA/EPO—Nov. 17, 2020.
(Continued)

*Primary Examiner* — Frantz Coby
(74) *Attorney, Agent, or Firm* — QUALCOMM Incorporated

(57) ABSTRACT

In an aspect, a BS is configured as a serving cell of a UE. The BS transmits data to the UE in accordance with a frequency hopping scheme over a first set of T-F resources of a first BWP and a second set of T-F resources of a second BWP. The BS (or another BS) further transmits, to the UE over a third BWP that is different than the second BWP, a PDCCH including a PI field with a PI associated with the transmitted data over the second set of T-F resources of the second BWP. The UE receives the data and the PDCCH. The UE processes the received data over (at least) the second set of T-F resources based on the PI.

27 Claims, 19 Drawing Sheets

(51) Int. Cl.
*H04W 72/044* (2023.01)
*H04W 72/23* (2023.01)

(58) Field of Classification Search
CPC ............................ H04W 72/044; H04W 72/23; H04W 72/0453
USPC .................................................. 370/328, 329
See application file for complete search history.

(56) References Cited

U.S. PATENT DOCUMENTS

| | | | |
|---|---|---|---|
| 2019/0253137 A1* | 8/2019 | Sun | H04B 7/2643 |
| 2019/0394772 A1* | 12/2019 | Li | H04W 72/23 |
| 2020/0100257 A1* | 3/2020 | Yang | H04W 72/566 |
| 2023/0224947 A1* | 7/2023 | Yang | H04W 72/542 370/329 |

FOREIGN PATENT DOCUMENTS

| | | | | | |
|---|---|---|---|---|---|
| CN | 112005593 A | * | 11/2020 | ........... | H04L 5/0053 |
| EP | 3641197 A1 | | 4/2020 | | |
| EP | 3914012 A1 | * | 11/2021 | ........... | H04L 1/1896 |
| EP | 3996317 A1 | * | 5/2022 | ............ | H04L 25/02 |
| WO | 2018175420 A1 | | 9/2018 | | |
| WO | 2018231036 A1 | | 12/2018 | | |
| WO | WO-2019032844 A1 | * | 2/2019 | ........... | H04L 5/0053 |
| WO | 2019041137 A1 | | 3/2019 | | |
| WO | 2019066318 A1 | | 4/2019 | | |
| WO | 2019129012 A1 | | 7/2019 | | |
| WO | WO-2019139955 A1 | * | 7/2019 | ......... | H04B 17/3912 |
| WO | 2019145834 A1 | | 8/2019 | | |
| WO | WO-2020067801 A1 | * | 4/2020 | ........... | H04L 5/0007 |

OTHER PUBLICATIONS

Sequans: "Remaining Details of Pre-Emption Indication", R1-1720904, 3GPP TSG RAN WG1 Meeting 91, Mobile Competence Centre, 650, Route Des Lucioles, F-06921 Sophia-Antipolis Cedex, France, vol. RAN WG1, No. Reno, USA, Nov. 27, 2017-Dec. 1, 2017, 4 Pages, Nov. 17, 2017, XP051369108, sections 1-3.
Supplementary European Search Report—EP20918304—Search Authority—The Hague—Oct. 11, 2023.
Zte, et al., "On Pre-Emption Indication", R1-1717043, 3GPP TSG RAN WG1 Meeting 90bis, Mobile Competence Centre, 650, Route Des Lucioles, F-06921 Sophia-Antipolis Cedex, France, vol. RAN WG1, No. Prague, CZ, Oct. 9, 2017-Oct. 13, 2017, pp. 1-10, Oct. 8, 2017, XP051340235, sections 1-3.

* cited by examiner

PDCCH WITH PREEMPTION INDICATION

The present application claims priority to International Application No. PCT/CN2020/075207, filed Feb. 14, 2020, which is herein incorporated by reference in its entirety.

BACKGROUND OF THE DISCLOSURE

1. Field of the Disclosure

Aspects of the disclosure relate generally to wireless communications and to techniques and apparatuses related to a Physical Downlink Control Channel (PDCCH) with a preemption indication.

2. Description of the Related Art

Wireless communication systems have developed through various generations, including a first-generation analog wireless phone service (1G), a second-generation (2G) digital wireless phone service (including interim 2.5G networks), a third-generation (3G) high speed data, Internet-capable wireless service, and a fourth-generation (4G) service (e.g., Long-Term Evolution (LTE), WiMax). There are presently many different types of wireless communication systems in use, including cellular and personal communications service (PCS) systems. Examples of known cellular systems include the cellular Analog Advanced Mobile Phone System (AMPS), and digital cellular systems based on code division multiple access (CDMA), frequency division multiple access (FDMA), time division multiple access (TDMA), the Global System for Mobile access (GSM) variation of TDMA, etc.

A fifth generation (5G) mobile standard calls for higher data transfer speeds, greater numbers of connections, and better coverage, among other improvements. The 5G standard (also referred to as "New Radio" or "NR"), according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments. Consequently, the spectral efficiency of 5G mobile communications should be significantly enhanced compared to the current 4G/LTE standard. Furthermore, signaling efficiencies should be enhanced and latency should be substantially reduced compared to current standards.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Various device types may be characterized as UEs. Starting in 3GPP Rel. 17, a number of these UE types are being allocated a new UE classification denoted as 'NR-Light'. Examples of UE types that fall under the NR-Light classification include wearable devices (e.g., smart watches, etc.), industrial sensors, video cameras (e.g., surveillance cameras, etc.), and so on. Generally, the UE types grouped under the NR-Light classification are associated with lower communicative capacity. For example, relative to 'normal' UEs (e.g., UEs not classified as NR-Light), NR-Light UEs may be limited in terms of maximum bandwidth (e.g., 5 MHz, 10 MHz, 20 MHz, etc.), maximum transmission power (e.g., 20 dBm, 14 dBm, etc.), number of receive antennas (e.g., 1 receive antenna, 2 receive antennas, etc.), and so on. Some NR-Light UEs may also be sensitive in terms of power consumption (e.g., requiring a long battery life, such as several years) and may be highly mobile. Moreover, in some designs, it is generally desirable for NR-Light UEs to co-exist with UEs implementing protocols such as eMBB, URLLC, LTE NB-IoT/MTC, and so on.

In 3GPP Rel. 15 and 3GPP Rel. 16, it is mandatory for UEs (i.e., 'premium' UEs) to support the maximum channel bandwidth defined for a respective band. For example, such premium UEs may be required to support 50 MHz for 15 kHz SCS, 100 MHz for 30/60 kHz SCS for band n78 (3300 MHz-3800 MHz). However, as noted above, NR-Light UEs may be limited in terms of maximum bandwidth, and thereby may be incapable of supporting the maximum channel bandwidth defined for a respective band (e.g., 10 MHz or 20 MHz in FR1, etc.).

In 3GPP Rel. 15 and 3GPP Rel. 16, UEs are not permitted to receive a PDSCH outside of an 'active' DL bandwidth part (BWP), and UEs are also not permitted to transmit PUSCH or PUCCH outside of an 'active' UL BWP. As used herein, an 'active' BWP for a respective UE refers to a BWP that is being actively monitored or transmitted upon by the respective UE.

In some designs, different UE types may be associated with different priority levels (e.g., a URLLC UE may have a higher priority than an eMBB UE or an IoT UE). Embodiments of the disclosure are directed to PDCCHs comprising PIs that are associated with resources on a different BWP than the BWP over which the PDCCH is received. In some designs (e.g., such as the NR-Light frequency hopping use case depicted in FIG. 7), such PDCCHs may provide various technical advantages, including facilitation of co-existence between higher priority UEs (e.g., ULRRC UEs) and lower priority UEs (e.g., eMBB or IoT UEs), granting the serving cell more flexibility in terms of resource preemption, and so on.

In an aspect of the disclosure, a method, a computer-readable medium, and an apparatus are provided. The apparatus may be a UE. The UE may receive, in accordance with a frequency hopping scheme, data over a first set of time-frequency (T-F) resources of a first bandwidth part (BWP) and a second set of T-F resources of a second BWP for the UE, wherein the first BWP and the second BWP are associated with the same serving cell. The UE may monitor, over a third BWP that is different than the second BWP, a Physical Dedicated Control Channel (PDCCH) including a first Preemption Indication (PI) field with a first PI associated with the received data over the second set of T-F resources of the second BWP. The UE may process the received data over the second set of T-F resources based on the first PI.

In another aspect of the disclosure, a method, a computer-readable medium, and an apparatus are provided. The apparatus may be a base station configured as a serving cell of a UE. The base station may transmit, to a user equipment (UE) in accordance with a frequency hopping scheme, data over a first set of time-frequency (T-F) resources of a first bandwidth part (BWP) and a second set of T-F resources of a second BWP for the UE. The base station may further transmit, to the UE over a third BWP that is different than the second BWP, a Physical Dedicated Control Channel (PDCCH) including a first Preemption Indication (PI) field with a first PI associated with the transmitted data over the second set of T-F resources of the second BWP.

Aspects generally include a method, apparatus, system, computer program product, non-transitory computer-readable medium, user equipment, cIoT user equipment, base station, wireless communication device, and/or processing system as substantially described with reference to and as illustrated by the drawings, and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

DETAILED DESCRIPTION

Figure 1:
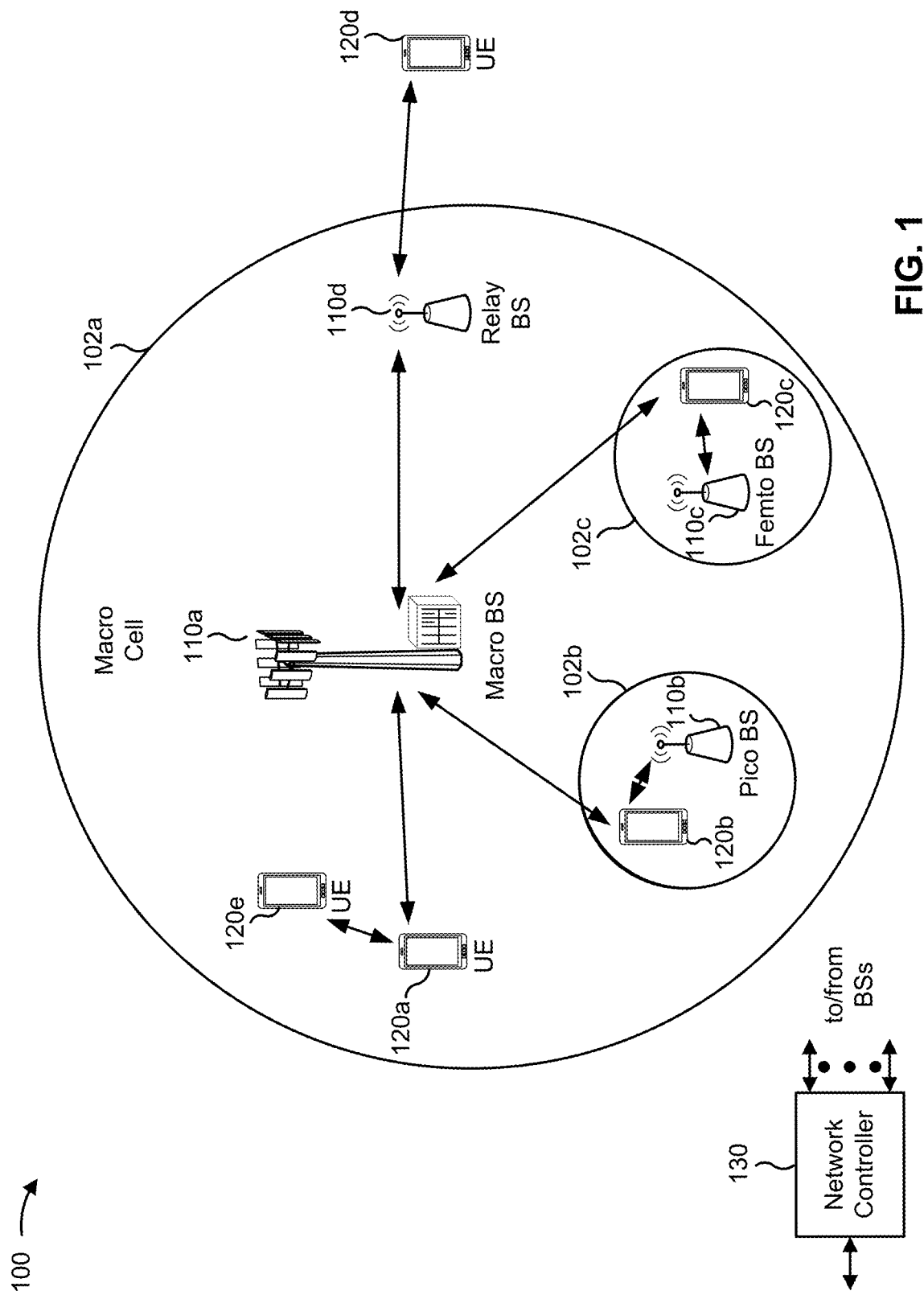
FIG. 1 is diagram illustrating an example of a wireless communication network.

The detailed description set forth below in connection with the appended drawings is intended as a description of various configurations and is not intended to represent the configurations in which the concepts described herein may be practiced. The detailed description includes specific details for the purposes of providing a thorough understanding of various concepts. However, it will be apparent to those skilled in the art that these concepts may be practiced without these specific details. In some instances, well-known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, and/or the like (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, and/or the like, whether referred to as software, firmware, middleware, microcode, hardware description language, or otherwise.

Accordingly, in one or more example embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), compact disk ROM (CD-ROM) or other optical disk storage, magnetic disk storage or other magnetic storage devices, combinations of the aforementioned types of computer-readable media, or any other medium that can be used to store computer executable code in the form of instructions or data structures that can be accessed by a computer.

It should be noted that while aspects may be described herein using terminology commonly associated with 3G and/or 4G wireless technologies, aspects of the present disclosure can be applied in other generation-based communication systems, such as 5G and later, including 5G technologies.

FIG. 1 is a diagram illustrating a wireless network 100 in which aspects of the present disclosure may be practiced. The wireless network 100 may be an LTE network or some other wireless network, such as a 5G network. The wireless network 100 may include a number of BSs 110 (shown as BS 110a, BS 110b, BS 110c, and BS 110d) and other network entities. A BS is an entity that communicates with user equipments (UEs) and may also be referred to as a base station, a 5G BS, a Node B, a gNB, a 5G NB, an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "5G BS", "gNB", "TRP", "AP", "node B", "5G NB", and "cell" may be used interchangeably herein.

In some examples, a cell may not necessarily be stationary, and the geographic area of the cell may move according to the location of a mobile BS. In some examples, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, etc. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. "MTC" may refer to MTC or eMTC. MTC UEs include, for example, robots, drones, remote devices, sensors, meters, monitors, location tags, etc., that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. IoT UEs, eMTC UEs, coverage enhancement (CE) mode UEs, bandwidth-limited (BL) UEs, and other types of UEs that operate using diminished power consumption relative to a baseline UE may be referred to herein as cellular IoT (cIoT) UEs. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, 5G RAT networks may be deployed.

In some examples, access to the air interface may be scheduled, wherein a scheduling entity (e.g., a base station) allocates resources for communication among some or all devices and equipment within the scheduling entity's service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity. Access to the air interface may be controlled, for example, using a unified access control (UAC) system in which UEs are associated with an access identity (e.g., an access class and/or the like), which may aim to ensure that certain high-priority UEs (e.g., emergency response UEs, mission critical UEs, and/or the like) can access the air interface even in congested conditions. Updates to the UAC parameters (e.g., priority levels associated with access identities, which access identities are permitted to access the air interface, and/or the like) may be provided for cIoT UEs using a message, such as a paging message or a direct indication information, which may conserve battery power of cIoT UEs.

Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

As indicated above, FIG. 1 is provided merely as an example. Other examples may differ from what is described with regard to FIG. 1.

Figure 2:
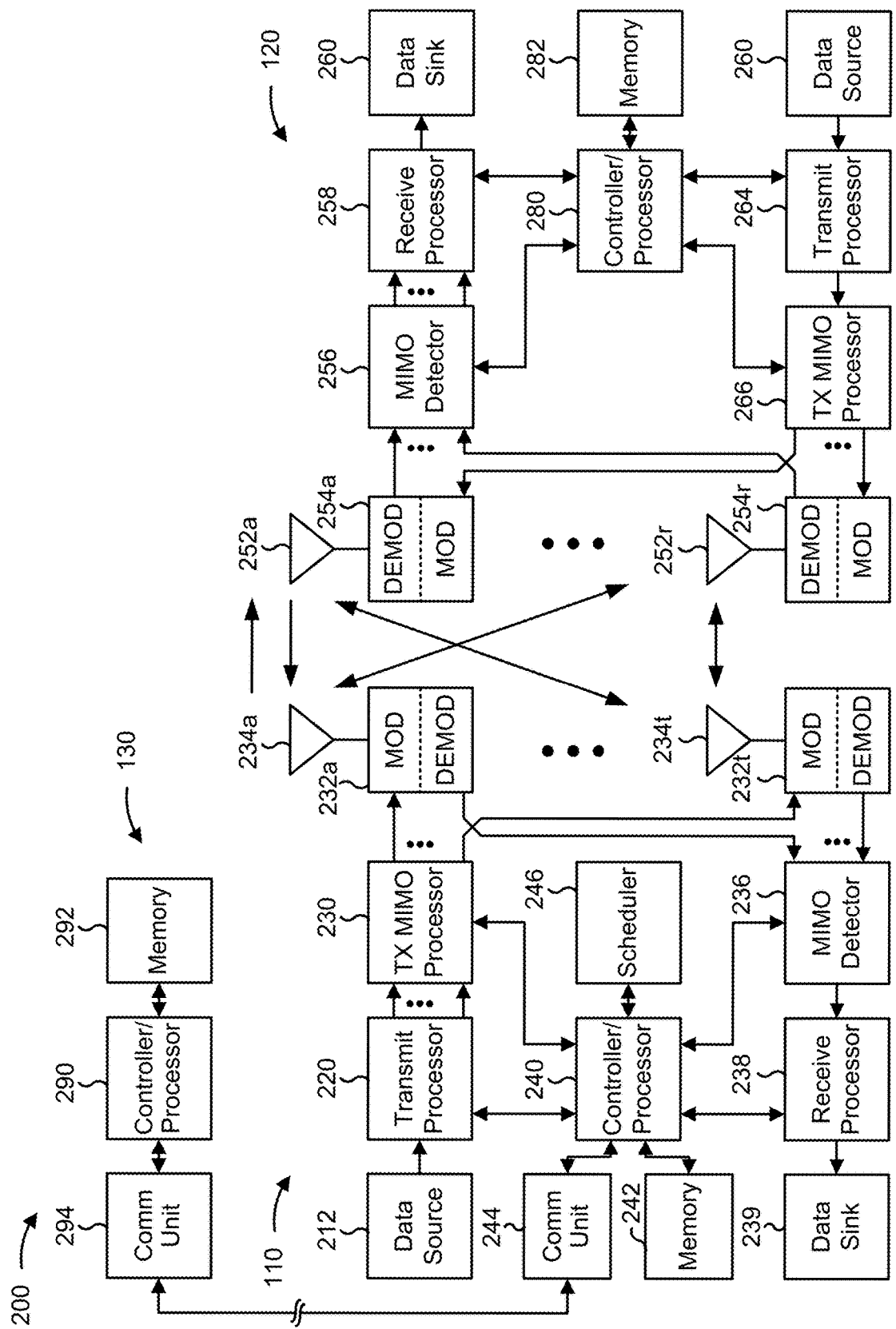
FIG. 2 is a diagram illustrating an example of a base station in communication with a UE in a wireless communication network.

FIG. 2 shows a block diagram 200 of a design of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, may select a modulation and coding scheme (MCS) for each UE based at least in part on channel quality indicators (CQIs) received from the UE, process (e.g., encode and modulate) the data for each UE based at least in part on the MCS selected for the UE, and provide data symbols for all UEs. Transmit processor 220 may also process system information (e.g., for semi-static resource partitioning information (SRPI), and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for orthogonal frequency divisional multiplexing (OFDM) and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive (RX) processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), a reference signal received quality (RSRQ), a channel quality indicator (CQI), and/or the like.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with UAC parameter updating, as described in more detail elsewhere herein. For example, controller/processor 240 of base station 110, controller/processor 280 of UE 120, and/or any other component(s) of FIG. 2 may perform or direct operations of various processes as described herein. Memories 242 and 282 may store data and program codes for BS 110 and UE 120, respectively. A scheduler 246 may schedule UEs for data transmission on the downlink and/or uplink.

As indicated above, FIG. 2 is provided merely as an example. Other examples may differ from what is described with regard to FIG. 2.

Figure 3A:
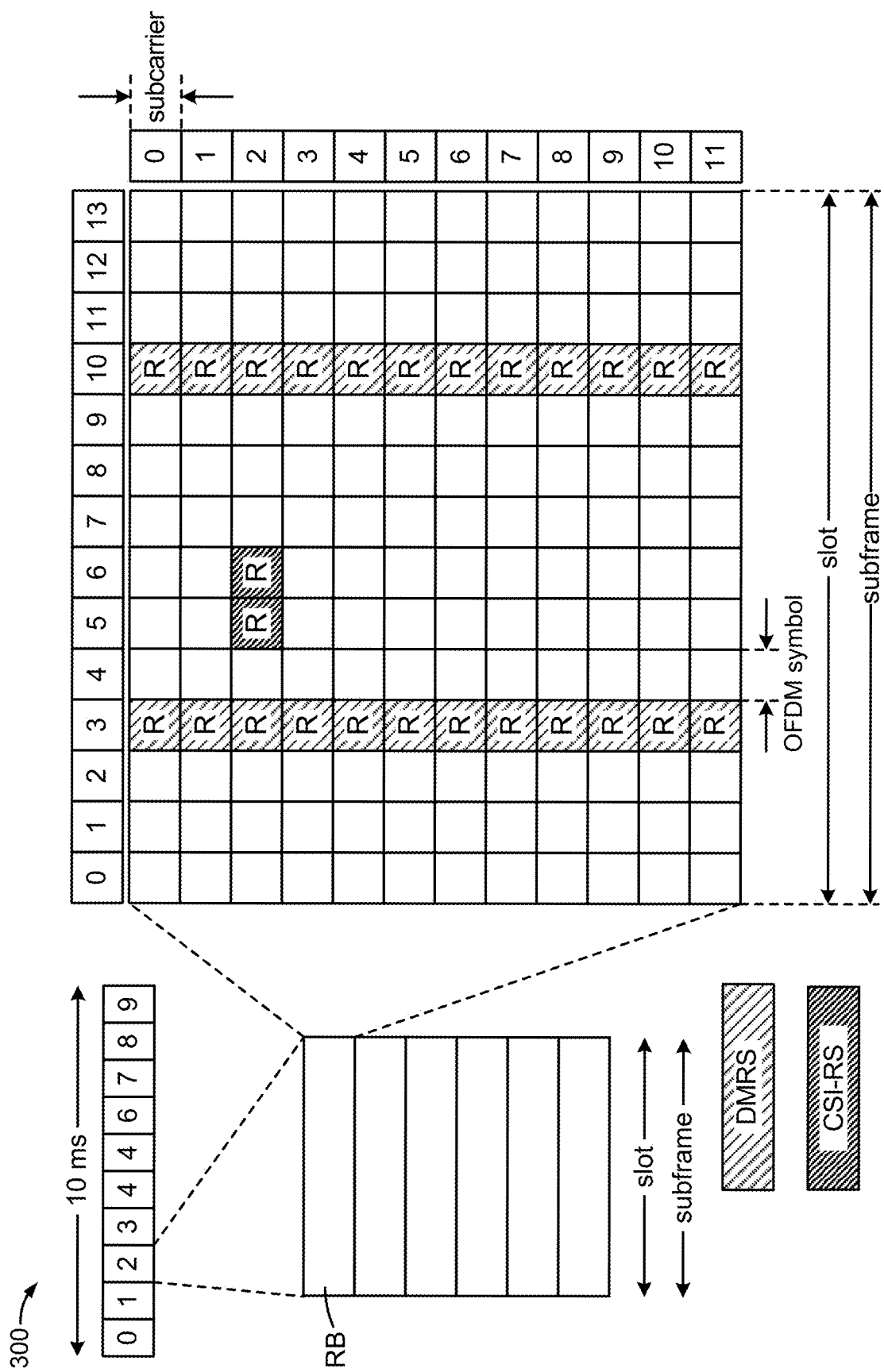
FIG. 3A is a diagram illustrating an example of a DL frame structure, according to aspects of the disclosure.
Figure 3B:
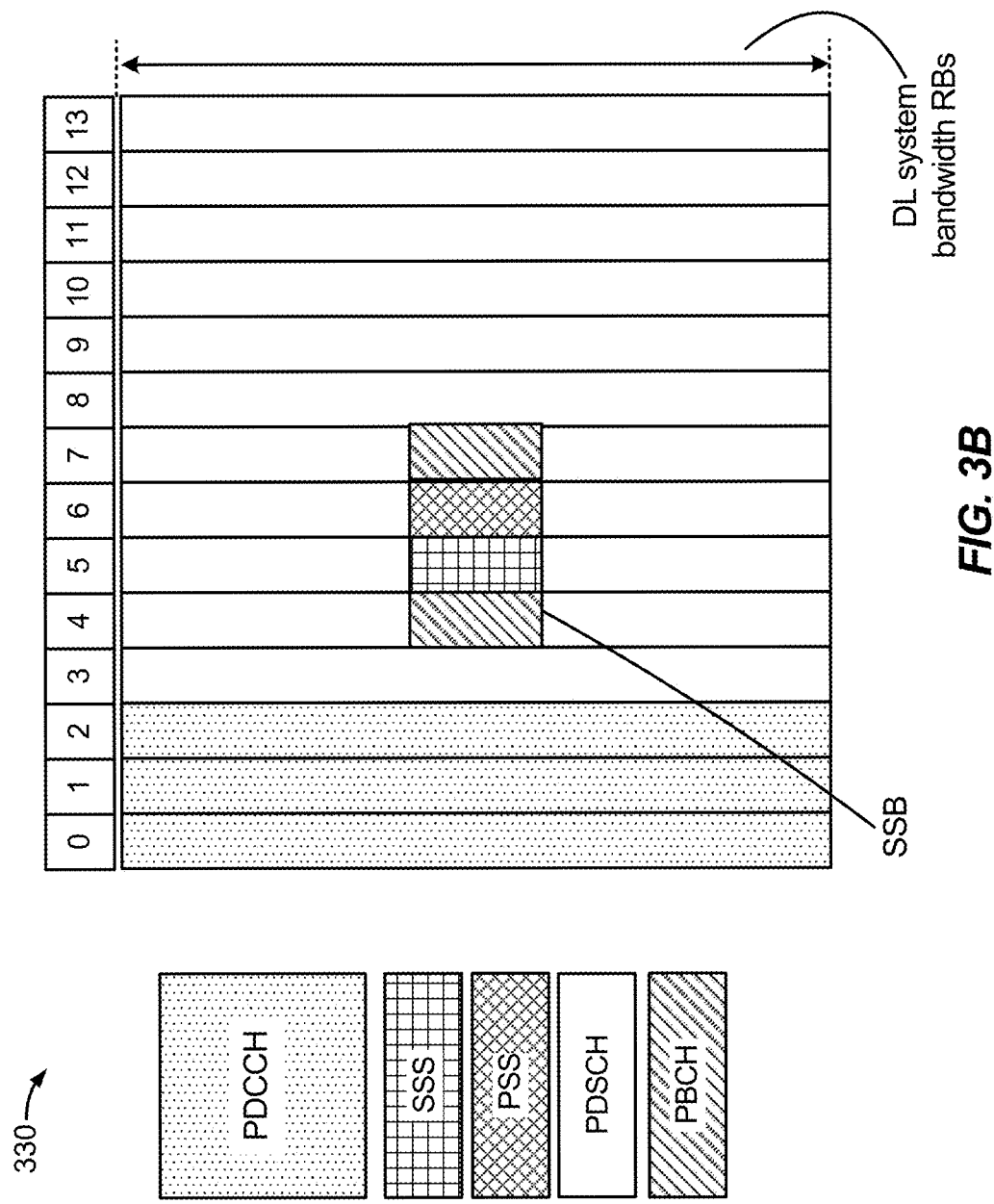
FIG. 3B is a diagram illustrating an example of channels within the DL frame structure, according to aspects of the disclosure.

FIG. 3A is a diagram 300 illustrating an example of a DL frame structure, according to aspects of the disclosure. FIG. 3B is a diagram 330 illustrating an example of channels within the DL frame structure, according to aspects of the disclosure. Other wireless communications technologies may have a different frame structures and/or different channels.

In some cases, NR may utilize OFDM on the downlink and single-carrier frequency division multiplexing (SC-FDM) on the uplink. In other cases, NR has an option to use OFDM on the uplink as well. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (resource block) may be 12 subcarriers (or 180 kHz). Consequently, the nominal FFT size may be equal to 128, 256, 512, 1024, or 2048 for system bandwidth of 1.25, 2.5, 5, 10, or 20 megahertz (MHz), respectively. The system bandwidth may also be partitioned into subbands. For example, a subband may cover 1.08 MHz (i.e., 6 resource blocks), and there may be 1, 2, 3, 8, or 16 subbands for system bandwidth of 1.25, 2.5, 5, 10, or 20 MHz, respectively.

NR may support multiple numerologies, for example, subcarrier spacing of 15 kHz, 30 kHz, 60 kHz, 120 kHz and 240 kHz or greater may be available. Table 1 provided below lists some various parameters for different NR numerologies.

TABLE 1

| Subcarrier spacing (kHz) | Symbols/ slot | slots/ sub- frame | slots/ frame | slot duration (ms) | Symbol duration (μs) | Max. nominal system BW (MHz) with 3K FFT size |
|---|---|---|---|---|---|---|
| 15 | 14 | 1 | 10 | 1 | 66.7 | 50 |
| 30 | 14 | 2 | 20 | 0.5 | 33.3 | 100 |
| 60 | 14 | 4 | 40 | 0.25 | 16.7 | 100 |
| 120 | 14 | 8 | 80 | 0.125 | 8.33 | 400 |
| 240 | 14 | 16 | 160 | 0.0625 | 4.17 | 800 |

In the examples of FIGS. 3A and 3B, a numerology of 15 kHz is used. Thus, in the time domain, a frame (e.g., 10 ms) is divided into 10 equally sized subframes of 1 ms each, and each subframe includes one time slot. In FIGS. 3A and 3B, time is represented horizontally (e.g., on the X axis) with time increasing from left to right, while frequency is represented vertically (e.g., on the Y axis) with frequency increasing (or decreasing) from bottom to top.

A resource grid may be used to represent time slots, each time slot including one or more time concurrent resource blocks (RBs) (also referred to as physical RBs (PRBs)) in the frequency domain. The resource grid is further divided into multiple resource elements (REs). An RE may correspond to one symbol length in the time domain and one subcarrier in the frequency domain. In the numerology of FIGS. 3A and 3B, for a normal cyclic prefix, an RB may contain 12 consecutive subcarriers in the frequency domain and 7 consecutive symbols (for DL, OFDM symbols; for UL, SC-FDMA symbols) in the time domain, for a total of 84 REs. For an extended cyclic prefix, an RB may contain 12 consecutive subcarriers in the frequency domain and 6 consecutive symbols in the time domain, for a total of 72 REs. The number of bits carried by each RE depends on the modulation scheme.

As illustrated in FIG. 3A, some of the REs carry DL reference (pilot) signals (DL-RS) for channel estimation at the UE. The DL-RS may include demodulation reference signals (DMRS) and channel state information reference signals (CSI-RS), exemplary locations of which are labeled "R" in FIG. 3A.

FIG. 3B illustrates an example of various channels within a DL subframe of a frame. The physical downlink control channel (PDCCH) carries DL control information (DCI) within one or more control channel elements (CCEs), each CCE including nine RE groups (REGs), each REG including four consecutive REs in an OFDM symbol. The DCI carries information about UL resource allocation (persistent and non-persistent) and descriptions about DL data transmitted to the UE. Multiple (e.g., up to 8) DCIs can be configured in the PDCCH, and these DCIs can have one of multiple formats. For example, there are different DCI formats for UL scheduling, for non-MIMO DL scheduling, for MIMO DL scheduling, and for UL power control.

A primary synchronization signal (PSS) is used by a UE to determine subframe/symbol timing and a physical layer identity. A secondary synchronization signal (SSS) is used by a UE to determine a physical layer cell identity group number and radio frame timing. Based on the physical layer identity and the physical layer cell identity group number, the UE can determine a PCI. Based on the PCI, the UE can determine the locations of the aforementioned DL-RS. The physical broadcast channel (PBCH), which carries an MIB, may be logically grouped with the PSS and SSS to form an SSB (also referred to as an SS/PBCH). The MIB provides a number of RBs in the DL system bandwidth and a system frame number (SFN). The physical downlink shared channel (PDSCH) carries user data, broadcast system information not transmitted through the PBCH such as system information blocks (SIBs), and paging messages.

As noted above, various device types may be characterized as UEs. Starting in 3GPP Rel. 17, a number of these UE types are being allocated a new UE classification denoted as 'NR-Light'. Examples of UE types that fall under the NR-Light classification include wearable devices (e.g., smart watches, etc.), industrial sensors, video cameras (e.g., surveillance cameras, etc.), and so on. Generally, the UE types grouped under the NR-Light classification are associated with lower communicative capacity. For example, relative to 'normal' UEs (e.g., UEs not classified as NR-Light), NR-Light UEs may be limited in terms of maximum bandwidth (e.g., 5 MHz, 10 MHz, 20 MHz, etc.), maximum transmission power (e.g., 20 dBm, 14 dBm, etc.), number of receive antennas (e.g., 1 receive antenna, 2 receive antennas, etc.), and so on. Some NR-Light UEs may also be sensitive in terms of power consumption (e.g., requiring a long battery life, such as several years) and may be highly mobile. Moreover, in some designs, it is generally desirable for NR-Light UEs to co-exist with UEs implementing protocols such as Ultra-Reliable Low-Latency Communication (URLLC), enhanced Mobile Broadband (eMBB), LTE NB-IoT/MTC, and so on.

In 3GPP Rel. 15 and 3GPP Rel. 16, it is mandatory for UEs (i.e., 'premium' UEs) to support the maximum channel bandwidth defined for a respective band. For example, such premium UEs may be required to support 50 MHz for 15 kHz SCS, 100 MHz for 30/60 kHz SCS for band n78 (3300 MHz-3800 MHz). However, as noted above, NR-Light UEs may be limited in terms of maximum bandwidth, and thereby may be incapable of supporting the maximum channel bandwidth defined for a respective band (e.g., 10 MHz or 20 MHz in FR1, etc.).

In 3GPP Rel. 15 and 3GPP Rel. 16, UEs are not permitted to receive a PDSCH outside of an 'active' DL bandwidth part (BWP), and UEs are also not permitted to transmit PUSCH or PUCCH outside of an 'active' UL BWP. As used herein, an 'active' BWP for a respective UE refers to a BWP that is being actively monitored or transmitted upon by the respective UE.

Figure 4A:
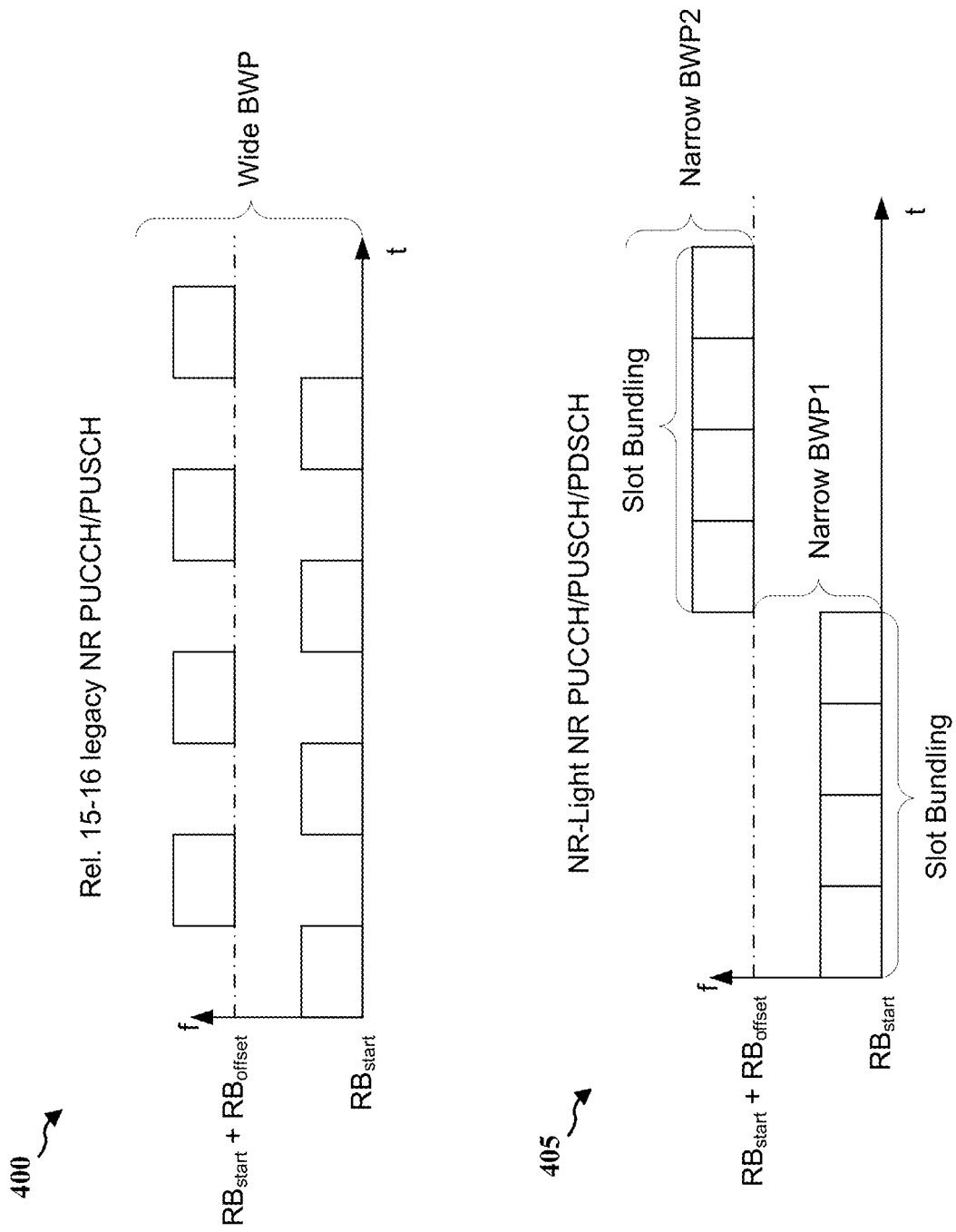
FIG. 4A illustrates frequency hopping scheme in accordance with aspects of the disclosure.

FIG. 4A illustrates frequency hopping scheme in accordance with aspects of the disclosure. In 3GPP Rel. 15 or 3GPP Rel. 16, frequency hopping for PUSCH/PUCCH is limited to the active BWP boundary, and frequency hopping for PDSCH is not supported. Accordingly, 400 depicts a frequency hopping scheme for PUCCH/PUSCH under 3GPP Rel. 15 or 3GPP Rel. 16, whereby a wide BWP is active for a premium UE, and frequency hops occur within the wide BWP. In particular, the premium UE hops between a first BWP subset denoted as RBstart and second BWP subset denoted as $RB_{start}+RB_{offset}$.

Referring to FIG. 4A, 405 depicts a frequency hopping scheme for PUCCH/PUSCH/PDSCH under 3GPP Rel. 17. As an example, the limited maximum bandwidth for NR-Light UEs may be such that intra-BWP UL frequency hopping may provide limited diversity gain (e.g., in contrast to 400, where intra-BWP frequency hopping occurs over the wide BWP). For this reason, NR-Light UEs may implement cross-BWP (or inter-BWP) frequency hopping with slot bundling for PUSCH/PUCCH/PDSCH as shown in 405. In 405, frequency hop interval for hops between BWP1 and BWP2 is increased relative to 400 (i.e., due to slot bundling). In some designs, the frequency hop offset between BWP1 and BWP2 may be indicated via RRC and/or DCI signaling. As an example, in 405, X successive slots may be bundled per hop to reduce RF retuning and/or to improve channel estimation and/or phase tracking. In some designs, BWP1 and BWP2 may have the same SCS and bandwidth, while being differentiated in terms of frequency location. At any given time, one of BWP1 and BWP2 may be active for a respective NR-Light UE, while the other BWP is inactive. When configured in this manner, BWP1 and BWP2 may be characterized as companion BWPs to each other.

Figure 4B:
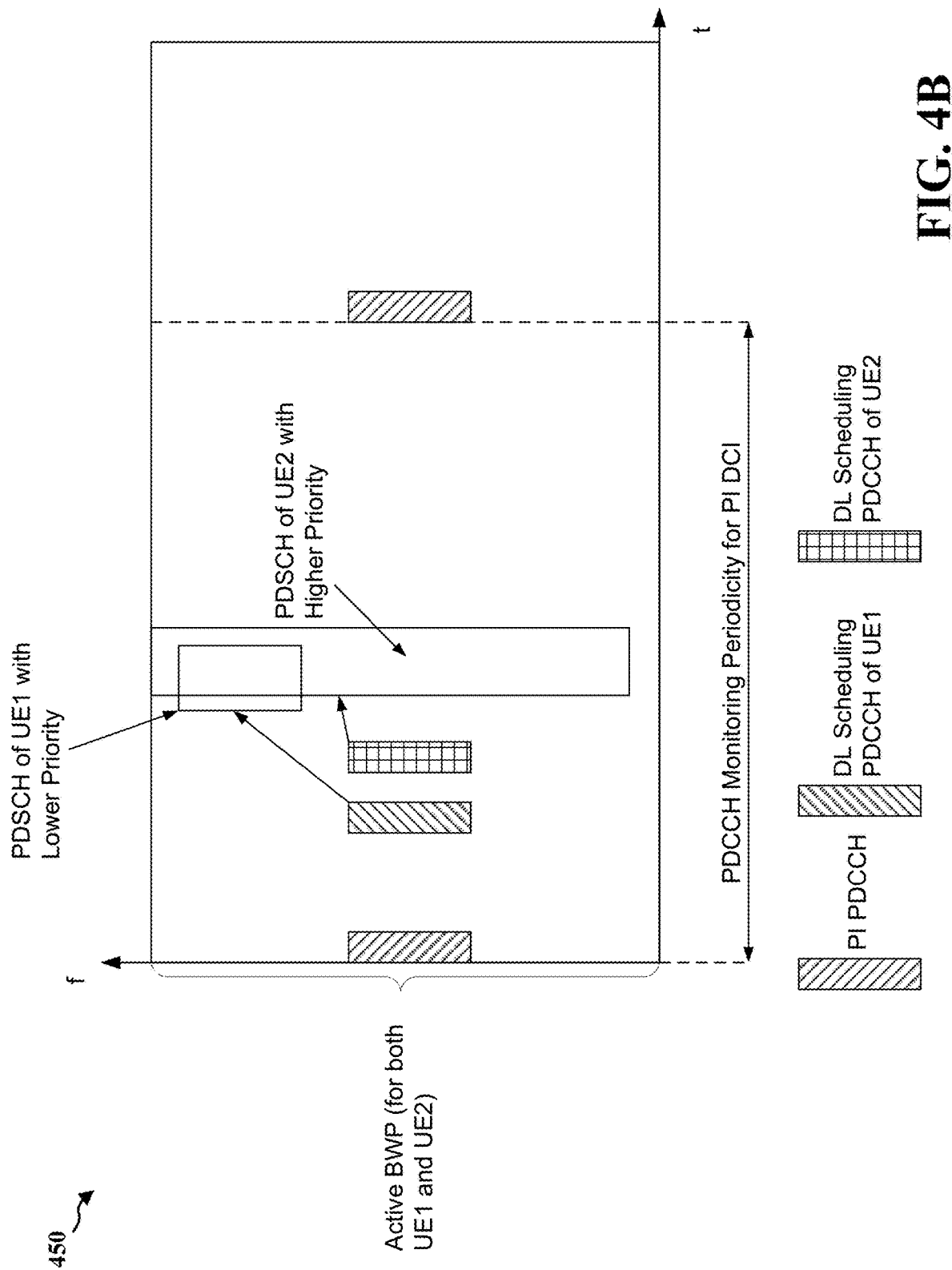
FIG. 4B illustrates a resource allocation scheme whereby a lower priority UE (i.e., UE 1) co-exists with a higher priority UE (i.e., UE 2).

In some designs, different UE types may be associated with different priority levels (e.g., a URLLC UE may have a higher priority than an eMBB UE or an IoT UE). FIG. 4B illustrates a resource allocation scheme whereby a lower priority UE (i.e., UE 1) co-exists with a higher priority UE (i.e., UE 2). In FIG. 4B, both UE 1 and UE 2 are premium UEs, with an entire part of the relevant BWP being active for both UEs. As shown in FIG. 4B, a scheduled PDSCH resource for UE 1 can be interrupted or preempted by UE 2 without an advance indication provided to UE 1 by a respective serving cell (e.g., due to insufficient time),In this case, the PDSCH received by UE 1 may be polluted with data for UE 2.

As shown in FIG. 4B, some PDCCHs are used for DL scheduling, while other PDDCHs are used to carry a DCI with one or more Preemption Indications (PIs) in one or more respective PI fields. The PIs specify which PDSCH resources, if any, were preempted since a previous PI PDCCH. PI PDCCHs are transmitted at a given PDCCH monitoring periodicity. In some designs, PI PDCCHs may be implemented as group-common (GC) PDCCH with a relatively long periodicity, while providing PIs over the nearest past PDCCH monitoring periodicity.

Figure 5:
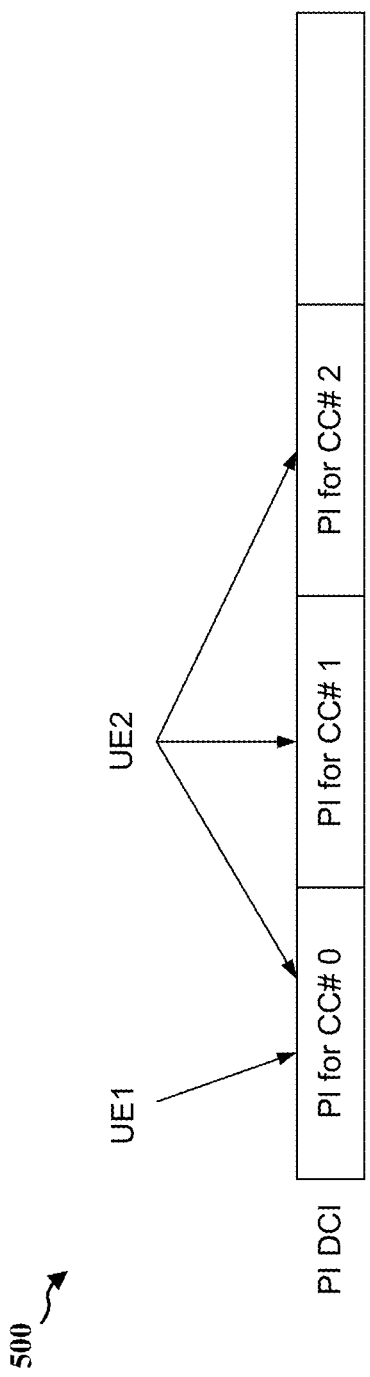
FIG. 5 depicts a PI DCI for a GC-PDCCH in accordance with an aspect of the disclosure.

FIG. 5 depicts a PI DCI 500 for a GC-PDCCH in accordance with an aspect of the disclosure. Referring to FIG. 5, each PI field may indicate whether preemption has occurred at a respective active DL BWP of one or more DL component carriers (CCs). In an example, a UE may be RRC-configured with one or more PI fields in the PI DCI to receive the PI for each configured DL serving cell.

Figure 6:
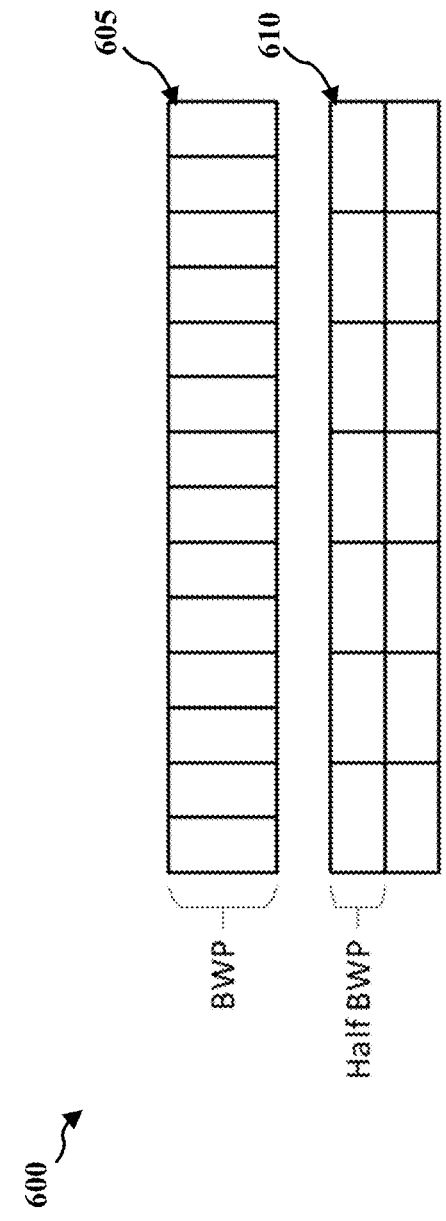
FIG. 6 illustrates example PI-to-resource mappings in accordance with aspects of the disclosure.

FIG. 6 illustrates example PI-to-resource mappings 600 in accordance with aspects of the disclosure. In some designs, for each PI field, 14 bits are used to represent the PI of the corresponding time-frequency (T-F) resources in a bitmap manner. In some designs, two T-F granularities (referred to herein as resource granularities) may be supported via RRC configuration. PI-to-resource mapping 605 depicts a first resource granularity whereby each bit in the 14 bit PI field maps to an entire BWP for one time unit of 14 time units (symbol groups), i.e., 14×1. PI-to-resource mapping 610 depicts a second resource granularity whereby each bit in the 14 bit PI field maps to half of the entire BWP for one time unit of 7 time units (symbol groups), i.e., 7×2. In some designs, the resource granularity (e.g., 14×1 or 7×2) is common across all DL CCs.

Figure 7:
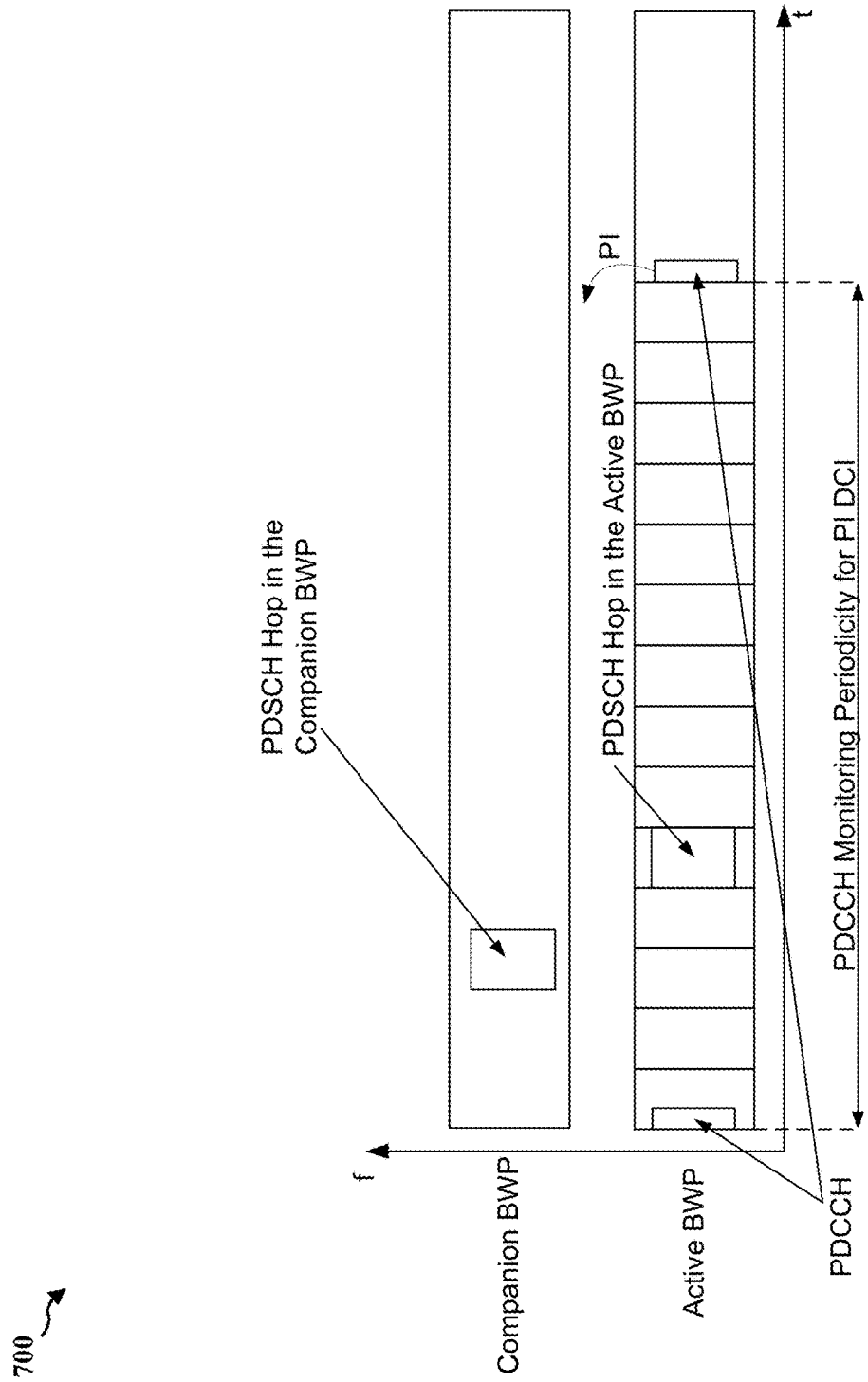
FIG. 7 illustrates wireless communication with frequency hopping for an NR-Light UE in accordance with an aspect of the disclosure.

FIG. 7 illustrates wireless communication 700 with frequency hopping for an NR-Light UE in accordance with an aspect of the disclosure. As shown in FIG. 7, the NR-Light UE hops back and forth between an active BWP and its associated companion BWP. A PI PDCCH is received on the active BWP. Under 3GPP Rel. 15 and 3GPP Rel. 16, the PI PDCCH can only specify resources for preemption on the active BWP. Accordingly, the PI PDCCH on the active BWP shown in FIG. 7 cannot indicate preemption for resources (e.g., a PDSCH) on the companion BWP.

Embodiments of the disclosure are directed to PDCCHs comprising PIs that are associated with resources on a different BWP than the BWP over which the PDCCH is received. In some designs (e.g., such as the NR-Light frequency hopping use case depicted in FIG. 7), such PDCCHs may provide various technical advantages, including facilitation of co-existence between higher priority UEs (e.g., ULRRC UEs) and lower priority UEs (e.g., eMBB or IoT UEs), granting the serving cell more flexibility in terms of resource preemption, and so on.

Figure 8:
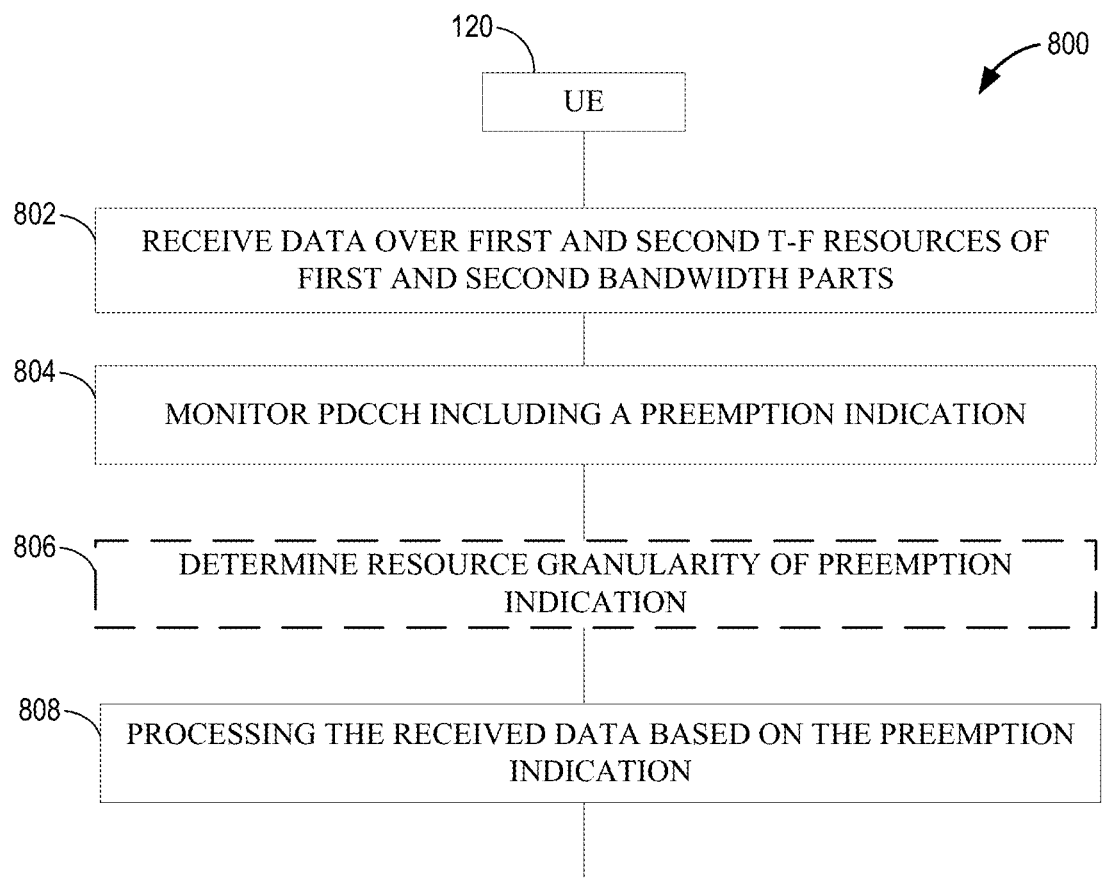
FIG. 8 illustrates an exemplary process of wireless communications according to an aspect of the disclosure.

FIG. 8 illustrates an exemplary process 800 of wireless communications according to an aspect of the disclosure. The process 800 of FIG. 8 is performed by UE 120.

At 802, UE 120 (e.g., antenna(s) 252a . . . 252r, MIMO detector 256, receive processor 258, etc.) receives, in accordance with a frequency hopping scheme, data over a first set of T-F resources of a first BWP and a second set of T-F resources of a second BWP for the UE, wherein the first BWP and the second BWP are associated with the same serving cell. In an example, one or more of the first and second sets of T-F resources may comprise a PDSCH. In a further example, the first and second BWPs may be non-overlapping WPs that each overlap with a wider BWP that is monitored by one or more other UEs associated with the same serving cell as UE 120.

At 804, UE 120 (e.g., antenna(s) 252a . . . 252r, MIMO detector 256, receive processor 258, etc.) monitors, over a third BWP that is different than the second BWP, a PDCCH including a first PI field with a first PI associated with the received data over the second set of T-F resources of the second BWP. In some designs, the first PI field is configured to indicate whether the first and second sets of T-F resources of the first and second BWPs, respectively, are preempted. For example, the first PI may be a common PI that is configured to indicate whether both the first and second sets of T-F resources of the first and second BWPs, respectively are preempted. In another example, the first PI may be configured to indicate whether the second set of T-F resources of the second BWP is preempted, and the first PI field may include a second PI configured to indicate whether the first set of T-F resources of the first BWP is preempted. In other designs, the first PI is configured to indicate whether the second set of T-F resources of the second BWP is preempted, whereby the PDCCH may further include a second PI field with a second PI configured to indicate whether the first set of T-F resources of the first BWP is preempted. In an example, the third BWP may correspond to the first BWP. In an alternative example, the third BWP may be separate from (e.g., non-overlapping with) both the first and second BWPs.

At 806, UE 120 (e.g., controller/processor 280, etc.) optionally determines a resource granularity associated with the first PI field. For example, the resource granularity may be determined based on higher-layer signaling, such as RRC signaling. In an example, the optional determination at 806 may determine the resource granularity based on a common resource granularity associated with a first number of time units (e.g.,14, mapped to 14×1), or a second resource granularity that is associated with a second number of time units (e.g., 7, mapped to 7×2) that is lower than the first number of time units, wherein the determined resource granularity includes one of the first resource granularity whereby an entirety of the first PI field being common to both the first and second sets of T-F resources of the first and second BWPs, respectively are preempted, or a third resource granularity that is associated with the second number of time units (e.g., 7, mapped to two separate 7×1s for respective BWPs) whereby the first PI of the first PI field is associated with the second set of T-F resources of the second BWP and a second PI of the first PI field is associated with the first set of T-F resources of the first BWP. In some designs, the first PI field may indicate resource preemption based on a first resource granularity, whereby a second PI field of the PDCCH indicates resource preemption based on a second resource granularity that is different than the first resource granularity. In other designs, each PI field in the PDCCH may be associated with a resource granularity that is common to each cell associated with the UE.

At 808, UE 120 (e.g., receive processor 258, controller/processor 280, etc.) processes the received data over the second set of T-F resources based on the first PI. For example, if the first PI indicates that the second set of T-F resources is preempted, the received data over the second set of T-F resources is discarded. In another example, if the first PI indicates that the second set of T-F resources is not preempted, the received data may be decoded and forwarded for higher-layer processing.

Figure 9:
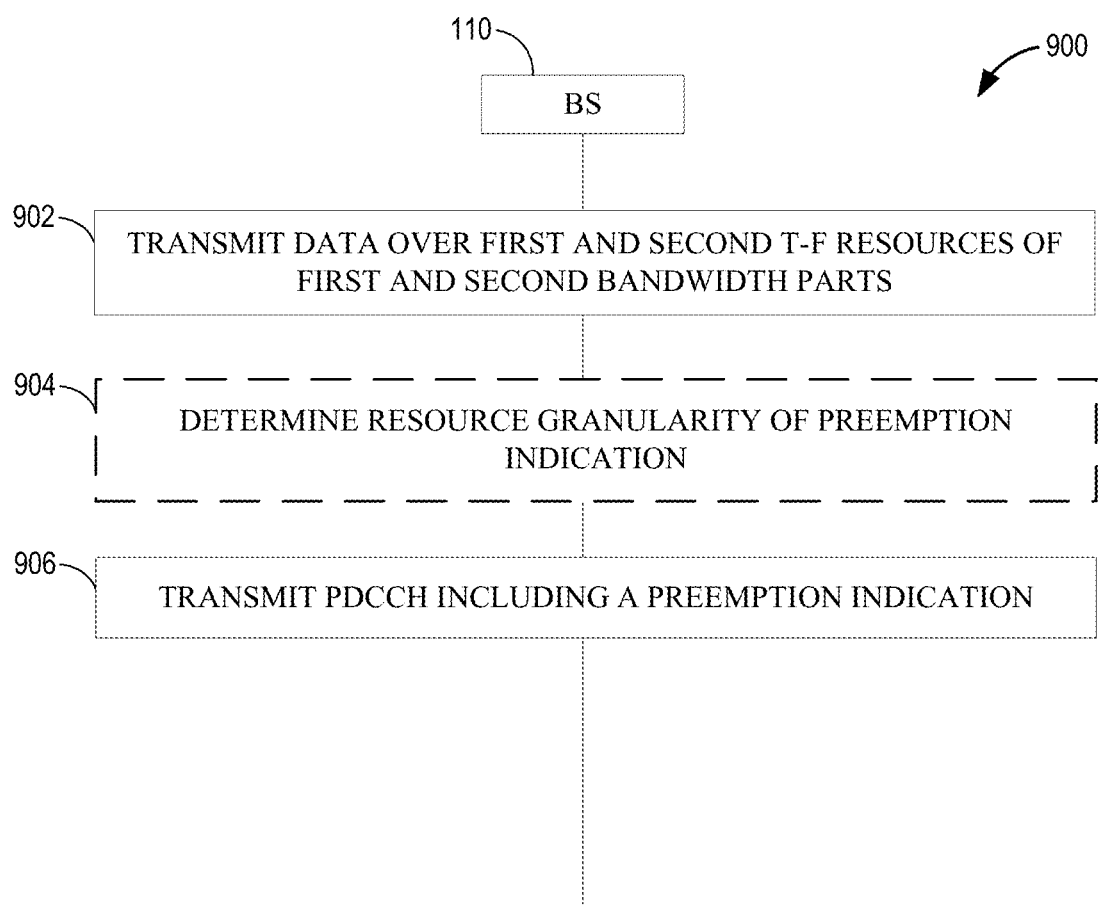
FIG. 9 illustrates an exemplary process of wireless communications according to another aspect of the disclosure.

FIG. 9 illustrates an exemplary process 900 of wireless communications according to an aspect of the disclosure. The process 900 of FIG. 9 is performed by BS 110.

At 902, BS 110 (e.g., antenna(s) 234*a* . . . 234*t*, modulators(s) 232*a* . . . 232*a*, TX MIMO processor 230, TX processor 220) transmits, to a UE in accordance with a frequency hopping scheme, data over a first set of T-F resources of a first BWP and a second set of T-F resources of a second BWP for the UE. In an example, one or more of the first and second sets of T-F resources may comprise a PDSCH. In a further example, the first and second BWPs may be non-overlapping BWPs that each overlap with a wider BWP that is monitored by one or more other UEs served by the base station.

At 904, BS 110 (e.g., controller/processor 240, etc.) optionally determines a resource granularity associated with a first PI field associated with a PI of a PDCCH. The determination of 904 may be conveyed to the UE (e.g., via higher-layer signaling such as RRC signaling) to facilitate the UE's optional determination at 806. The determination may be based on various factors. The determined resource granularity may be configured as described above with respect to 806.

At 906, BS 110 (e.g., antenna(s) 234*a* . . . 234*t*, modulators(s) 232*a* . . . 232*a*, TX MIMO processor 230, TX processor 220) transmits, to the UE over a third BWP that is different than the second BWP, a PDCCH including a first PI field with a first PI associated with the transmitted data over the second set of T-F resources of the second BWP. In some designs, the first PI field is configured to indicate whether the first and second sets of T-F resources of the first and second BWPs, respectively, are preempted. For example, the first PI may be a common PI that is configured to indicate whether both the first and second sets of T-F resources of the first and second BWPs, respectively are preempted. In another example, the first PI may be configured to indicate whether the second set of T-F resources of the second BWP is preempted, and the first PI field may include a second PI configured to indicate whether the first set of T-F resources of the first BWP is preempted. In other designs, the first PI is configured to indicate whether the second set of T-F resources of the second BWP is preempted, whereby the PDCCH may further include a second PI field with a second PI configured to indicate whether the first set of T-F resources of the first BWP is preempted. In an example, the third BWP may correspond to the first BWP. In an alternative example, the third BWP may be separate from (e.g., non-overlapping with) both the first and second BWPs.

Figure 10:
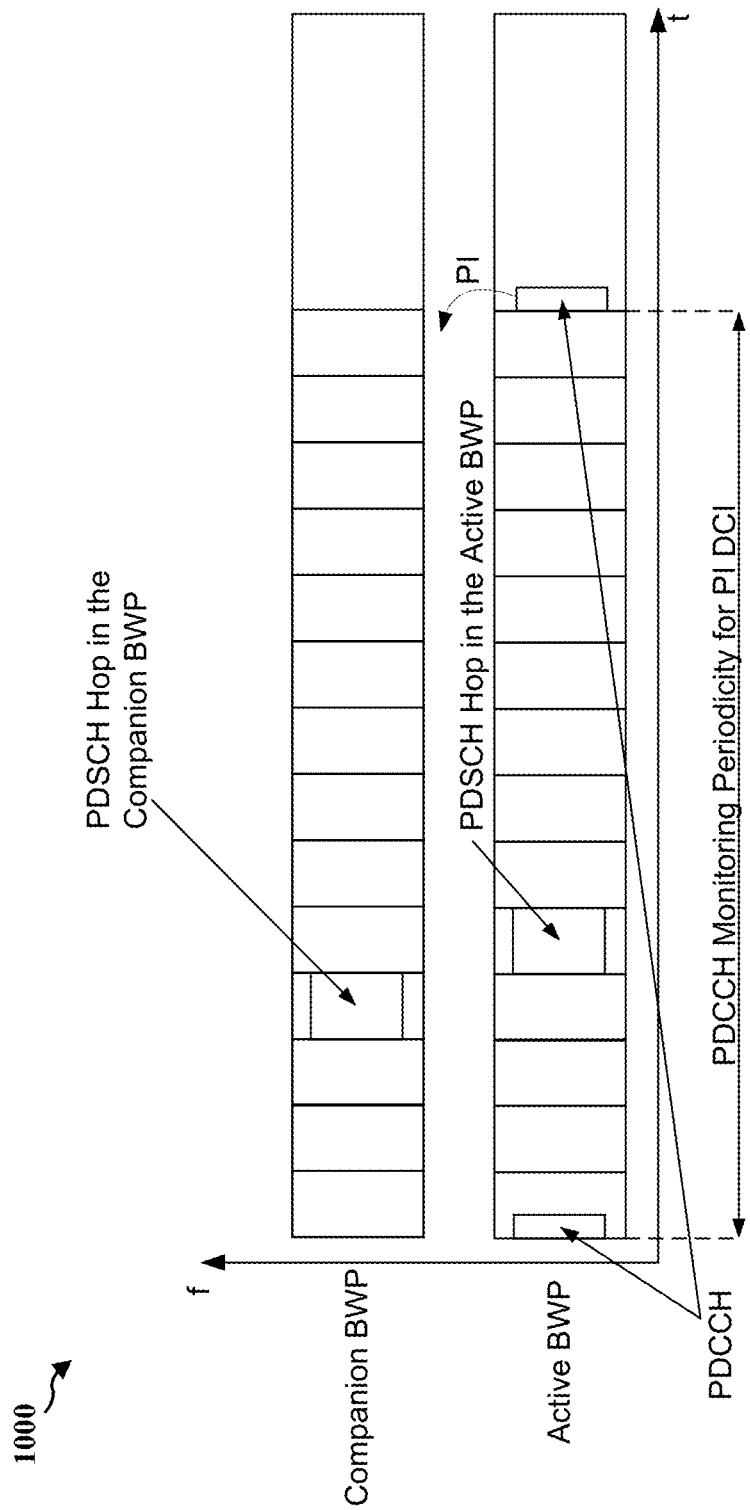
FIG. 10 illustrates a PI-to-resource mapping in accordance with an example implementation of the processes of FIGS. 8-9.

FIG. 10 illustrates a PI-to-resource mapping 1000 in accordance with an example implementation of the processes 800-900 of FIGS. 8-9. In FIG. 10, the first PI is common to both a first UE (e.g., an NR-Light UE) and a second UE (e.g., a premium UE). For the first UE, the first PI is mapped to a time unit for both the first BWP (i.e., active BWP) and the second BWP (i.e., companion BWP) in accordance with a resource granularity of 14×1. For the second UE, the first PI is mapped to a time unit for a wider BWP in accordance with the same resource granularity of 14×1. In this case, the configuration of the first PI field is similar to a legacy 3GPP Rel. 15/16 PI field with a resource granularity of 14×1, but first PI is common to multiple UEs and (for at least one of the UEs) is mapped not only to its respective active BWP, but also to its respective companion BWP as well.

Figure 11:
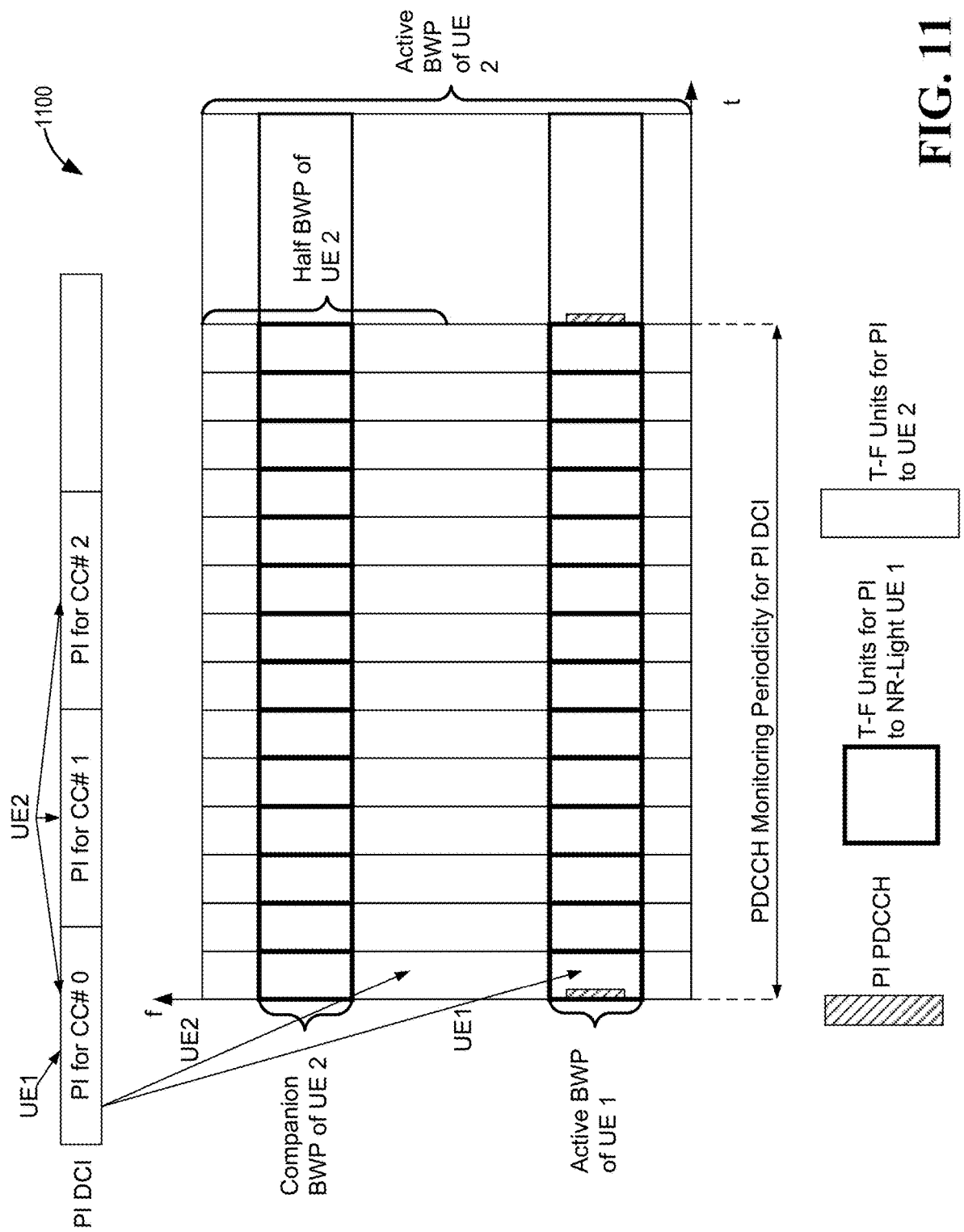
FIG. 11 illustrates an example implementation of the PI-to-resource mapping of FIG. 10 in accordance with an embodiment of the disclosure.

FIG. 11 illustrates an example implementation 1100 of the PI-to-resource mapping 1000 of FIG. 10 in accordance with an embodiment of the disclosure. In FIG. 11, the PI for CC #0 is common to both UE 1 and UE 2. UE 1 is an NR-Light UE that interprets PI for CC #0 as associated with its respective active BWP and its respective companion BWP. UE 2 is a premium UE that interprets PI for CC #0 as associated with its wider active BWP.

Referring to FIGS. 8-9, in another example, multiple PI fields may be included in the PI DCI for a particular CC, e.g.:

TABLE 2

PI GC-DCI Configuration Example

| PI for CC#0 (active BWP) | PI for CC#0 (companion BWP) | PI for CC#1 | ... |
|---|---|---|---|

As shown in Table 2, the two PI fields for the active BWP and the companion BWP for the same serving cell may be adjacent to each other in the GC-DCI of the PI PDCCH, although such a configuration is not expressly required. Accordingly, the number of PI fields per DL serving cell may be different within the same GC-DCI. In an example, the number of PI fields of a DL serving cell may be implicitly determined from the corresponding configuration of companion BWP.

Figure 12:
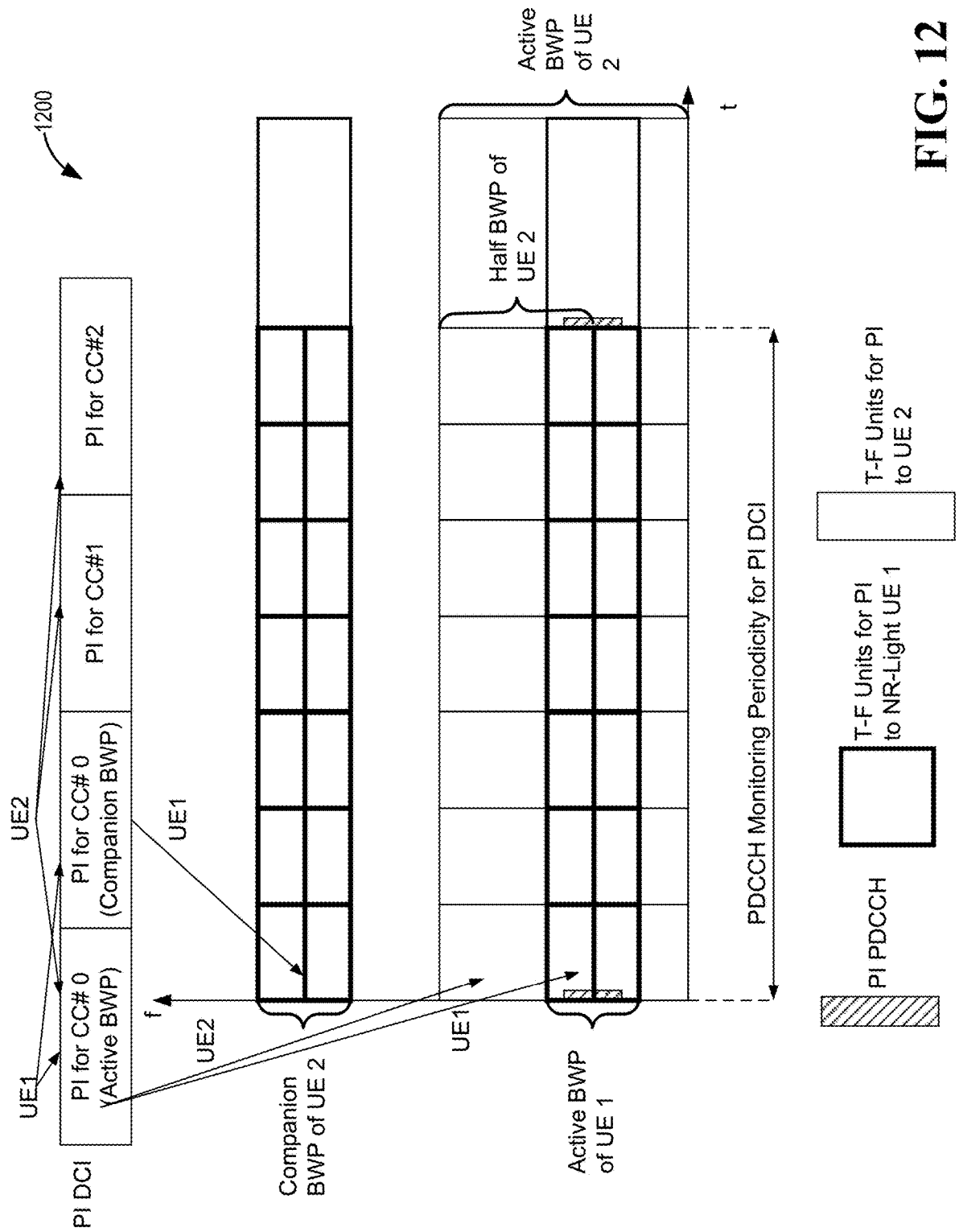
FIG. 12 illustrates a PI-to-resource mapping in accordance with another example implementation of the processes of FIGS. 8-9.

FIG. 12 illustrates a PI-to-resource mapping 1200 in accordance with another example implementation of the processes 800-900 of FIGS. 8-9. In FIG. 11, the PI for CC #0 is common to both UE 1 and UE 2. UE 1 is an NR-Light UE that interprets a first PI field comprising a PI for CC #0 (active BWP) as associated with its respective active BWP only. UE 2 is a premium UE that interprets PI for CC #0 as associated with its wider active BWP. UE 1 further interprets a second PI field comprising a PI for CC #0 (companion BWP) as associated with its respective companion BWP only.

Figure 13:
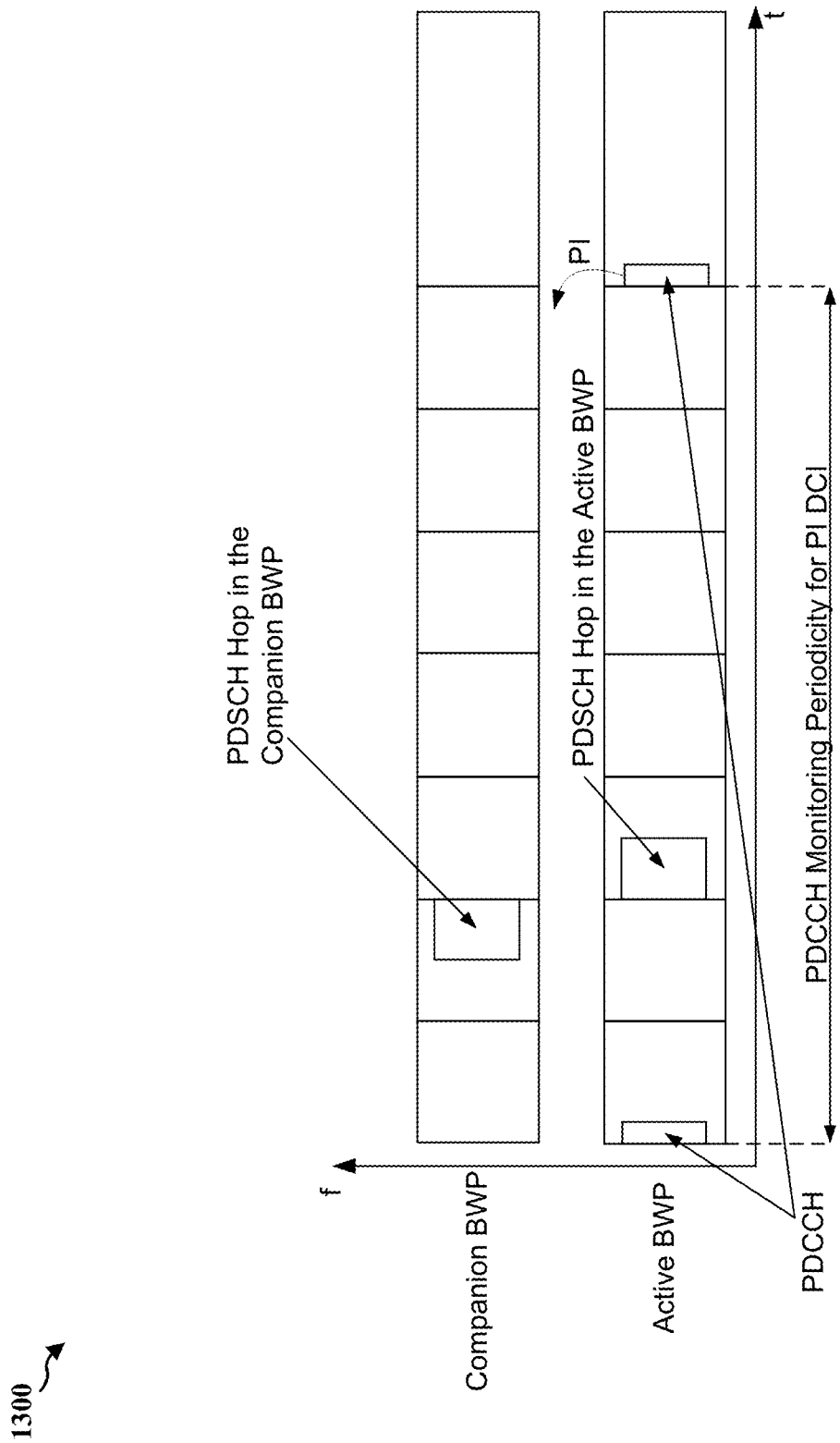
FIG. 13 illustrates a PI-to-resource mapping in accordance with another example implementation of the processes of FIGS. 8-9.

FIG. 13 illustrates a PI-to-resource mapping 1300 in accordance with another example implementation of the processes 800-900 of FIGS. 8-9. In FIG. 13, the first PI field is bifurcated into two PIs that are each associated with a resource granularity of 7×1. The first PI is mapped to a time unit for one of the first and second BWPs, while a second PI is mapped to a time unit for the other BWP. In this case, the configuration of the first PI field is similar to a legacy 3GPP Rel. 15/16 PI field with a resource granularity of 7×2, but the mapping is actually two separate 7×1 mappings that includes one 7×1 mapping associated with the companion BWP.

Figure 14:
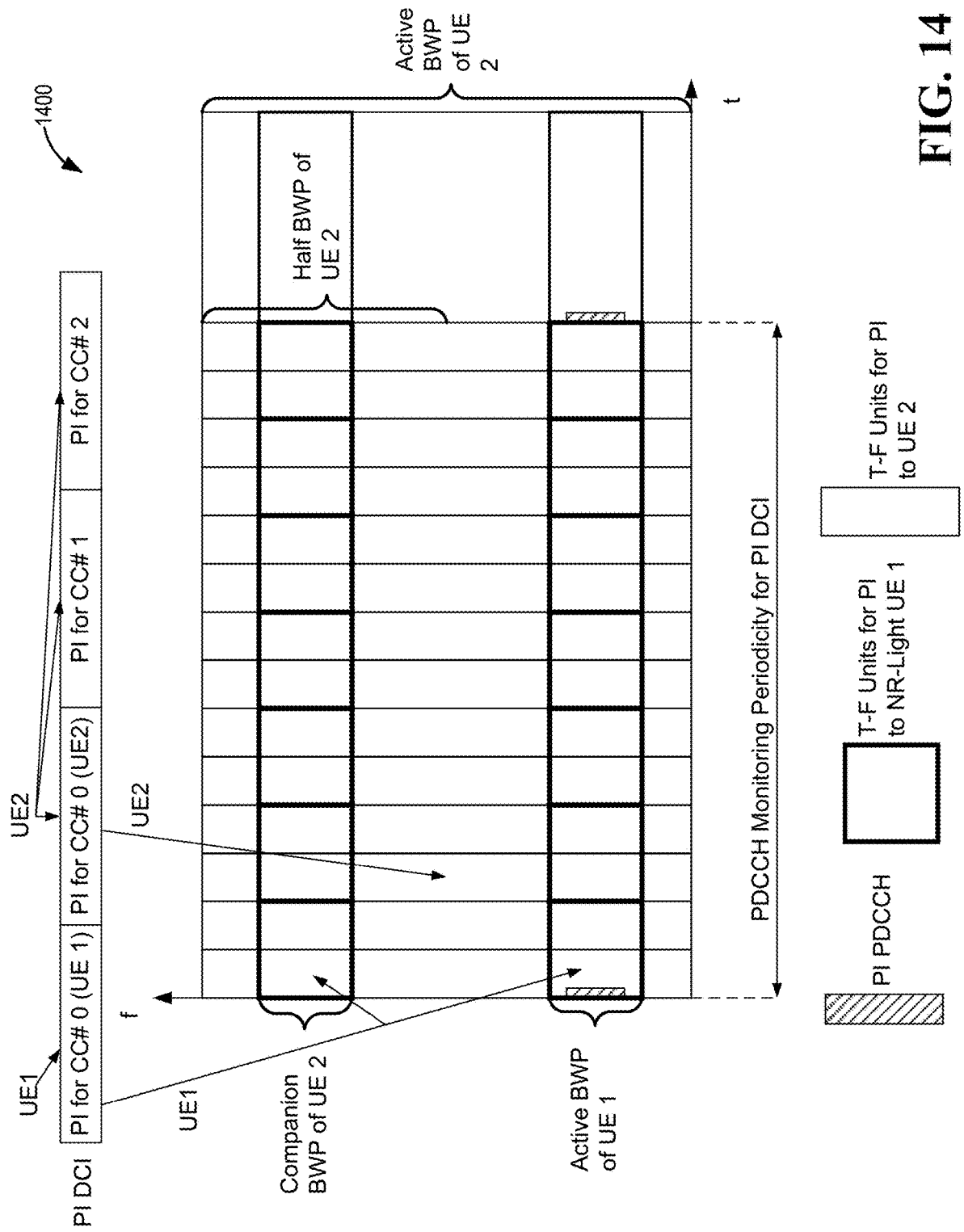
FIG. 14 illustrates an example implementation of the PI-to-resource mapping of FIG. 13 in accordance with an embodiment of the disclosure.

FIG. 14 illustrates an example implementation 1400 of the PI-to-resource mapping 1300 of FIG. 13 in accordance with an embodiment of the disclosure. In FIG. 13, a first PI field is associated with UE 1, and a second PI field is associated with UE 2. UE 1 is an NR-Light UE that interprets a first part (e.g., 7×1) of the PI for CC #0 (for UE 1) as associated with its respective active BWP and interprets a second part (e.g., 7×1) of the PI for CC #0 (for UE 1) as associated with its respective companion BWP. UE 2 is a premium UE that interprets PI for CC #0 (UE 2) as associated with its wider active BWP.

Figure 15:
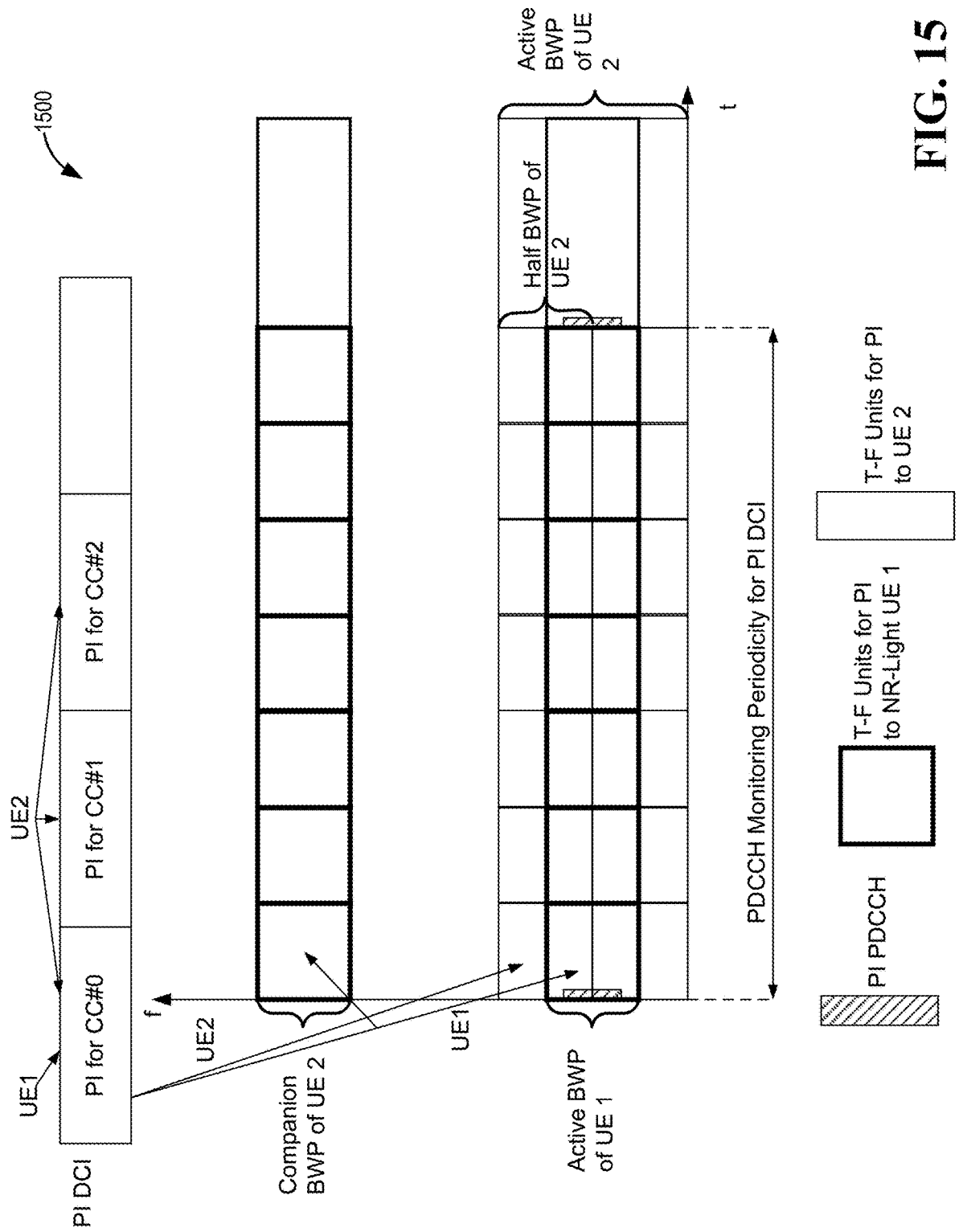
FIG. 15 illustrates an example implementation of the PI-to-resource mapping of FIG. 13 in accordance with another embodiment of the disclosure

FIG. 15 illustrates an example implementation 1500 of the PI-to-resource mapping 1300 of FIG. 13 in accordance with another embodiment of the disclosure. In FIG. 14, each CC is associated with one PI field. The PI for CC #0 is common to both UE 1 and UE 2. UE 1 is an NR-Light UE that interprets a first part (e.g., 7×1) of the PI for CC #0 as associated with its respective active BWP and interprets a second part (e.g., 7×1) of the PI for CC #0 as associated with its respective companion BWP. UE 2 is a premium UE that interprets PI for CC #0 as associated with its wider active BWP.

Referring to FIGS. 10 and 13, in some designs, the PI-to-resource mapping 1000 or the PI-to-resource mapping 1300 may be implicitly indicated based on the resource granularity for the respective PI field. For example, the PI-to-resource mapping 1000 can use 14×1 or 7×2, while the PI-to-resource mapping 1300 can use 7×2 (which is broken up as two separate 7×1s for two BWPs). In this case, a resource granularity of 7×2 can be used as an implicit indication of the PI-to-resource mapping 1300 for a respective PI field, whereas a resource granularity of 14×1 can be used as an implicit indication of the PI-to-resource mapping 1000 for the respective PI field.

Figure 16:
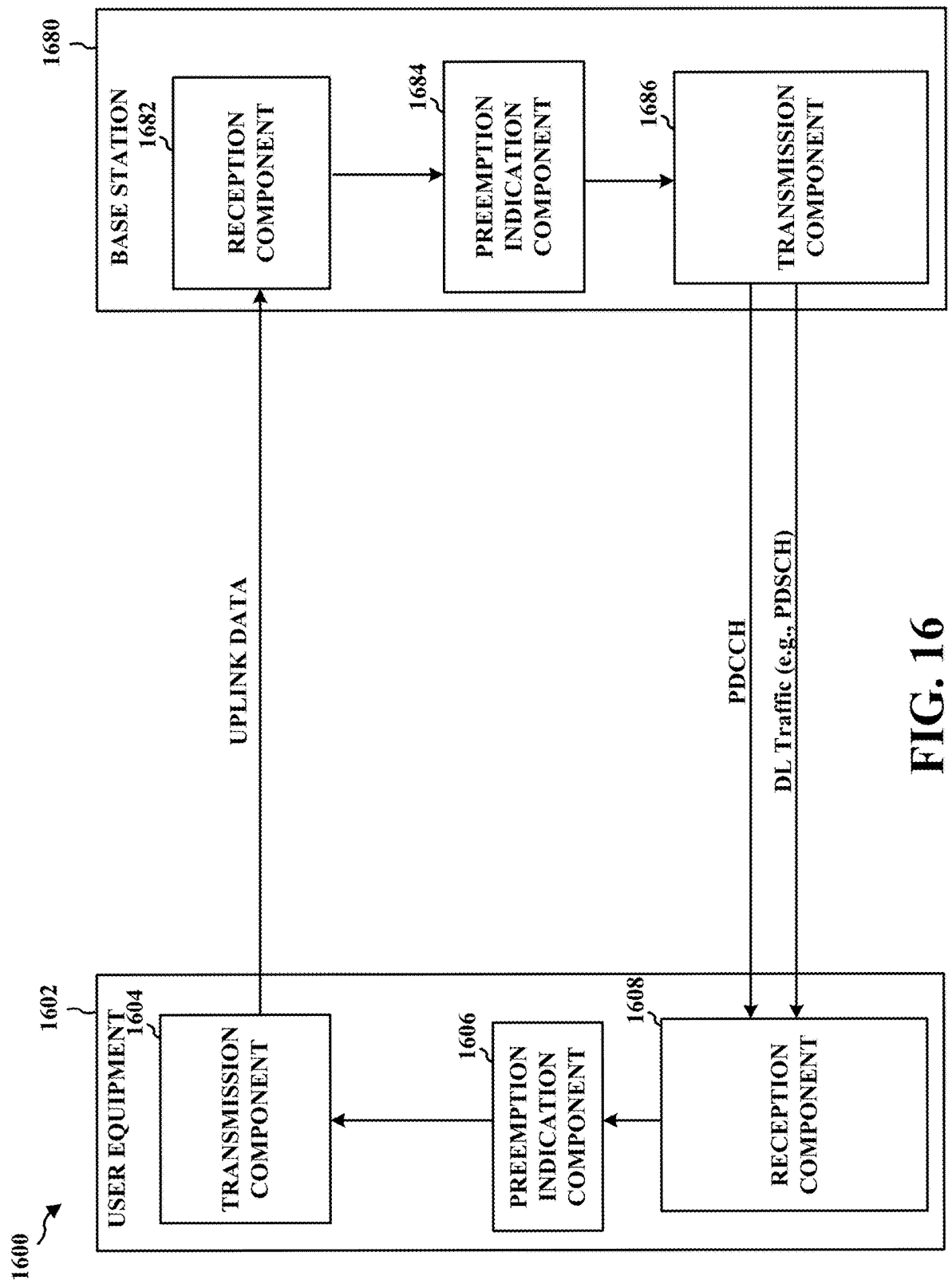
FIG. 16 is a conceptual data flow diagram illustrating the data flow between different means/components in exemplary apparatuses in accordance with an embodiment of the disclosure.

FIG. 16 is a conceptual data flow diagram 1600 illustrating the data flow between different means/components in exemplary apparatuses 1602 and 1680 in accordance with an embodiment of the disclosure. The apparatus 1602 may be a UE (e.g., UE 120) in communication with an apparatus 1680, which may be a base station (e.g., base station 110).

The apparatus 1602 includes a transmission component 1604, which may correspond to transmitter circuitry in UE 120 as depicted in FIG. 2, including controller/processor 280, antenna(s) 252a ... 252r, modulators(s) 254a ... 254r, TX MIMO processor 266, TX processor 264. The apparatus 1602 further includes PI component 1606, which may correspond to processor circuitry in UE 120 as depicted in FIG. 2, including controller/processor 280, etc. The apparatus 1602 further includes a reception component 1608, which may correspond to receiver circuitry in UE 120 as depicted in FIG. 2, including controller/processor 280, antenna(s) 252a ... 252r, demodulators(s) 254a ... 254r, MIMO detector 256, RX processor 258.

The apparatus 1680 includes a reception component 1682, which may correspond to receiver circuitry in BS 110 as depicted in FIG. 2, including controller/processor 240, antenna(s) 234a ... 234r, demodulators(s) 232a ... 232r, MIMO detector 236, RX processor 238, communication unit 244. The apparatus 1680 further optionally includes a PI component 1684, which may correspond to processor circuitry in BS 110 as depicted in FIG. 2, including controller/processor 240. The apparatus 1680 further includes a transmission component 1686, which may correspond to transmission circuitry in BS 110 as depicted in FIG. 2, including e.g., controller/processor 240, antenna(s) 234a ... 234r, modulators(s) 232a ... 232r, Tx MIMO processor 230, TX processor 220, communication unit 244.

Referring to FIG. 16, the PI component 1684 determines whether to preempt data (e.g., PDSCH) associated with a scheduled transmission to a first UE with data for a second UE. The transmission component 1686 transmits a PDSCH to the reception component 1608, and further transmits a PDCCH with PI(s) that indicate whether or not DL data (such as the PDSCH) is preempted. The PI component 1606 processes the data based on the PI(s). Uplink data may also be transmitted from the transmission component 1604 to the reception component 1682.

Figure 17:
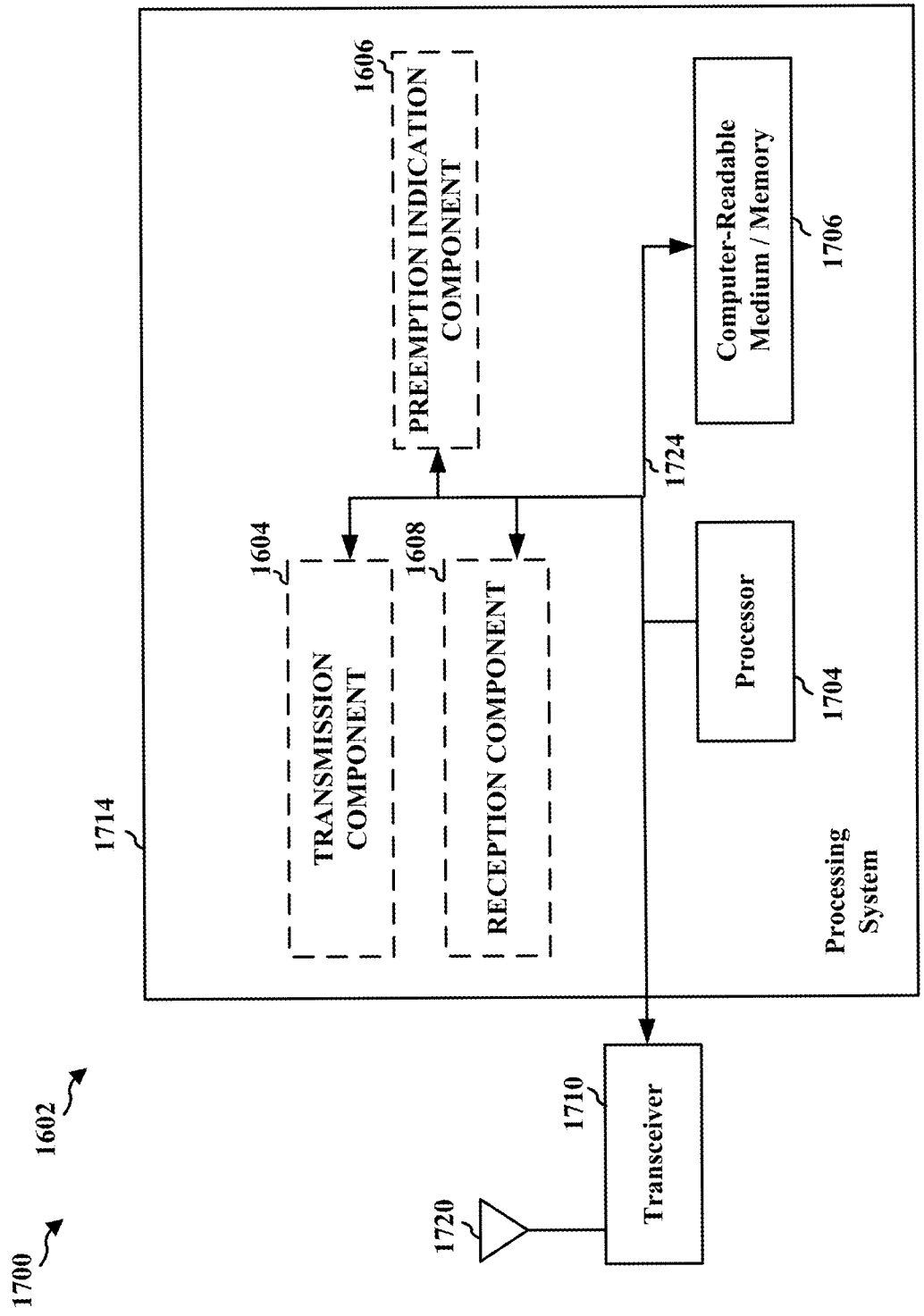
FIG. 17 is a diagram illustrating an example of a hardware implementation for an apparatus employing a processing system.

One or more components of the apparatus 1602 and apparatus 1680 may perform each of the blocks of the algorithm in the aforementioned flowcharts of FIGS. 8-9. As such, each block in the aforementioned flowcharts of FIGS. 8-9 may be performed by a component and the apparatus 1602 and apparatus 1680 may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof FIG. 17 is a diagram 1700 illustrating an example of a hardware implementation for an apparatus 1602 employing a processing system 1714. The processing system 1714 may be implemented with a bus architecture, represented generally by the bus 1724. The bus 1724 may include any number of interconnecting buses and bridges depending on the specific application of the processing system 1714 and the overall design constraints. The bus 1724 links together various circuits including one or more processors and/or hardware components, represented by the processor 1704, the components 1604, 1606 and 1608, and the computer-readable medium/memory 1706. The bus 1724 may also link various other circuits such as timing sources, peripherals, voltage regulators, and power management circuits, which are well known in the art, and therefore, will not be described any further.

The processing system 1714 may be coupled to a transceiver 1710. The transceiver 1710 is coupled to one or more antennas 1720. The transceiver 1710 provides a means for communicating with various other apparatus over a transmission medium. The transceiver 1710 receives a signal from the one or more antennas 1720, extracts information from the received signal, and provides the extracted information to the processing system 1714, specifically the reception component 1608. In addition, the transceiver 1710 receives information from the processing system 1714, specifically the transmission component 1604, and based on the received information, generates a signal to be applied to the one or more antennas 1720. The processing system 1714 includes a processor 1704 coupled to a computer-readable medium/memory 1706. The processor 1704 is responsible for general processing, including the execution of software stored on the computer-readable medium/memory 1706. The software, when executed by the processor 1704, causes the processing system 1714 to perform the various functions described supra for any particular apparatus. The computer-readable medium/memory 1706 may also be used for storing data that is manipulated by the processor 1704 when executing software. The processing system 1714 further includes at least one of the components 1604, 1606 and 1608. The components may be software components running in the processor 1704, resident/stored in the computer readable medium/memory 1706, one or more hardware components coupled to the processor 1704, or some combination thereof. The processing system 1714 may be a component of the UE 120 of FIG. 2 and may include the memory 282, and/or at least one of the TX processor 264, the RX processor 258, and the controller/processor 280.

In one configuration, the apparatus 1602 (e.g., a UE) for wireless communication includes means for receiving, in accordance with a frequency hopping scheme, data over a first set of time-frequency (T-F) resources of a first bandwidth part (BWP) and a second set of T-F resources of a second BWP for the UE, wherein the first BWP and the second BWP are associated with the same serving cell, means for monitoring, over a third BWP that is different than the second BWP, a Physical Dedicated Control Channel (PDCCH) including a first Preemption Indication (PI) field with a first PI associated with the received data over the second set of T-F resources of the second BWP, and means for processing the received data over the second set of T-F resources based on the first PI.

The aforementioned means may be one or more of the aforementioned components of the apparatus 1602 and/or the processing system 1714 of the apparatus 1602 configured to perform the functions recited by the aforementioned means. As described supra, the processing system 1714 may include the TX processor 264, the RX processor 258, and the controller/processor 280.

Figure 18:
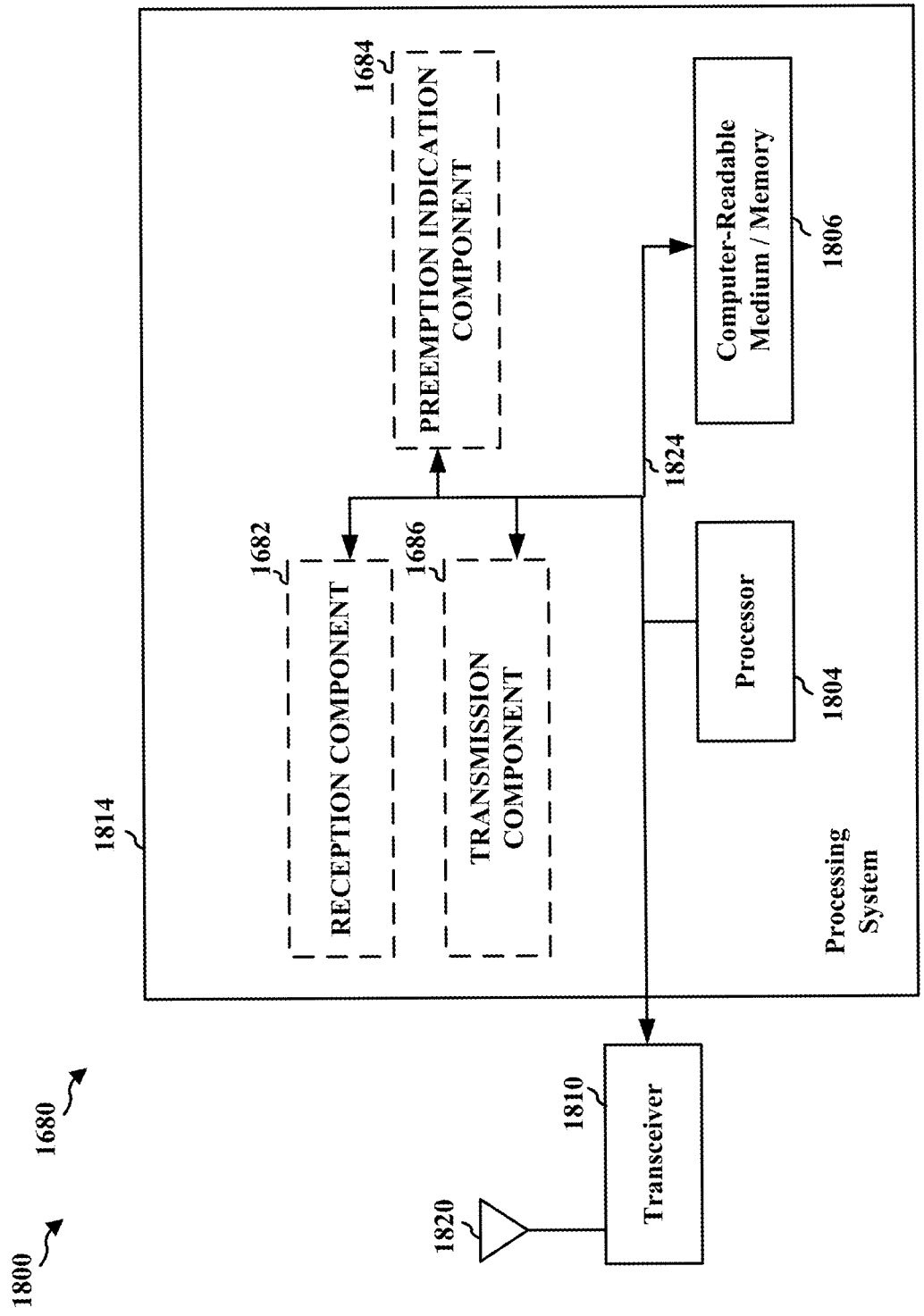
FIG. 18 is a diagram illustrating another example of a hardware implementation for an apparatus employing a processing system.

FIG. 18 is a diagram 1800 illustrating an example of a hardware implementation for an apparatus 1680 employing a processing system 1814. The processing system 1814 may be implemented with a bus architecture, represented generally by the bus 1824. The bus 1824 may include any number of interconnecting buses and bridges depending on the specific application of the processing system 1814 and the overall design constraints. The bus 1824 links together various circuits including one or more processors and/or hardware components, represented by the processor 1804, the components 1682, 1684 and 1686, and the computer-readable medium/memory 1806. The bus 1824 may also link various other circuits such as timing sources, peripherals, voltage regulators, and power management circuits, which are well known in the art, and therefore, will not be described any further.

The processing system 1814 may be coupled to a transceiver 1810. The transceiver 1810 is coupled to one or more antennas 1820. The transceiver 1810 provides a means for communicating with various other apparatus over a transmission medium. The transceiver 1810 receives a signal from the one or more antennas 1820, extracts information from the received signal, and provides the extracted information to the processing system 1814, specifically the reception component 1682. In addition, the transceiver 1810 receives information from the processing system 1814, specifically the transmission component 1686, and based on the received information, generates a signal to be applied to the one or more antennas 1820. The processing system 1814 includes a processor 1804 coupled to a computer-readable medium/memory 1806. The processor 1804 is responsible for general processing, including the execution of software stored on the computer-readable medium/memory 1806. The software, when executed by the processor 1804, causes the processing system 1814 to perform the various functions described supra for any particular apparatus. The computer-readable medium/memory 1806 may also be used for storing data that is manipulated by the processor 1804 when executing software. The processing system 1814 further includes at least one of the components 1682, 1684 and 1686. The components may be software components running in the processor 1804, resident/stored in the computer readable medium/memory 1806, one or more hardware components coupled to the processor 1804, or some combination thereof. The processing system 1814 may be a component of the BS 110 of FIG. 2 and may include the memory 242, and/or at least one of the TX processor 220, the RX processor 238, and the controller/processor 240.

In one configuration, the apparatus 1680 (e.g., a BS) for wireless communication includes means for transmitting, to a user equipment (UE) in accordance with a frequency hopping scheme, data over a first set of time-frequency (T-F) resources of a first bandwidth part (BWP) and a second set of T-F resources of a second BWP for the UE, and means for transmitting, to the UE over a third BWP that is different than the second BWP, a Physical Dedicated Control Channel (PDCCH) including a first Preemption Indication (PI) field with a first PI associated with the transmitted data over the second set of T-F resources of the second BWP The aforementioned means may be one or more of the aforementioned components of the apparatus 1680 and/or the processing system 1814 of the apparatus 1680 configured to perform the functions recited by the aforementioned means. As described supra, the processing system 1814 may include the TX processor 220, the RX processor 238, and the controller/processor 240.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of operating a user equipment (UE), comprising:
   receiving, in accordance with a frequency hopping scheme, data over a first set of time-frequency (T-F) resources of a first bandwidth part (BWP) and a second set of T-F resources of a second BWP for the UE, wherein the first BWP and the second BWP are associated with the same serving cell;
   monitoring, over a third BWP that is different than the second BWP, a Physical Dedicated Control Channel (PDCCH) including a first Preemption Indication (PI) field with a first PI associated with the received data over the second set of T-F resources of the second BWP; and
   processing the received data over the second set of T-F resources based on the first PI.

2. The method of claim 1, wherein the third BWP is the first BWP.

3. The method of claim 1, wherein the first PI field is configured to indicate whether the first and second sets of T-F resources of the first and second BWPs, respectively, are preempted.

4. The method of claim 3, wherein the first PI is a common PI that is configured to indicate whether both the first and second sets of T-F resources of the first and second BWPs, respectively are preempted.

5. The method of claim 3,
   wherein the first PI is configured to indicate whether the second set of T-F resources of the second BWP is preempted, and
   wherein the first PI field includes a second PI configured to indicate whether the first set of T-F resources of the first BWP is preempted.

6. The method of claim 1, wherein the first PI is configured to indicate whether the second set of T-F resources of the second BWP is preempted.

7. The method of claim 6, wherein the PDCCH further includes a second PI field with a second PI configured to indicate whether the first set of T-F resources of the first BWP is preempted.

8. The method of claim 7, wherein the first and second PI fields are adjacent to each other in the downlink control information (DCI) conveyed by the PDCCH.

9. The method of claim 7, wherein multiple PI fields are associated with the same CC based on the frequency hopping scheme being used with respect to the first and second BWPs.

10. The method of claim 1,
    wherein the first PI field indicates resource preemption based on a first resource granularity, and
    wherein a second PI field of the PDCCH indicates resource preemption based on a second resource granularity that is different than the first resource granularity.

11. The method of claim 1, further comprising:
    determining a resource granularity associated with the first PI field based on a common resource granularity associated with a first number of time units, or a second resource granularity that is associated with a second number of time units that is lower than the first number of time units,
    wherein the determined resource granularity includes one of:
    the first resource granularity whereby an entirety of the first PI field being common to both the first and second sets of T-F resources of the first and second BWPs, respectively are preempted,
    a third resource granularity that is associated with the second number of time units whereby the first PI of the first PI field is associated with the second set of T-F resources of the second BWP and a second PI of the first PI field is associated with the first set of T-F resources of the first BWP.

12. A method of operating a base station configured as a serving cell of a user equipment (UE), comprising:
    transmitting, to a user equipment (UE) in accordance with a frequency hopping scheme, data over a first set of time-frequency (T-F) resources of a first bandwidth part (BWP) and a second set of T-F resources of a second BWP for the UE; and
    transmitting, to the UE over a third BWP that is different than the second BWP, a Physical Dedicated Control Channel (PDCCH) including a first Preemption Indication (PI) field with a first PI associated with the transmitted data over the second set of T-F resources of the second BWP.

13. The method of claim 12, wherein the third BWP is the first BWP.

14. The method of claim 12, further comprising:
determining whether to preempt the first set of T-F resources of the first BWP, the second set of T-F resources of the second BWP, or a combination thereof, wherein the first PI field is configured based on the determining.

15. The method of claim 14, wherein the first PI field is configured to indicate whether the first and second sets of T-F resources of the first and second BWPs, respectively, are preempted.

16. The method of claim 15, wherein the first PI is a common PI that is configured to indicate whether both the first and second sets of T-F resources of the first and second BWPs, respectively are preempted.

17. The method of claim 15,
wherein the first PI is configured to indicate whether the second set of T-F resources of the second BWP is preempted, and
wherein the first PI field includes a second PI configured to indicate whether the first set of T-F resources of the first BWP is preempted.

18. The method of claim 14, wherein the first PI is configured to indicate whether the second set of T-F resources of the second BWP is preempted.

19. The method of claim 18, wherein the PDCCH further includes a second PI field with a second PI configured to indicate whether the first set of T-F resources of the first BWP is preempted.

20. The method of claim 19, wherein the first and second PI fields are adjacent to each other in the downlink control information (DCI) conveyed by the PDCCH.

21. The method of claim 19, multiple PI fields are associated with the same CC based on the frequency hopping scheme being used with respect to the first and second BWPs.

22. The method of claim 12,
wherein the first PI field indicates resource preemption based on a first resource granularity, and
wherein a second PI field of the PDCCH indicates resource preemption based on a second resource granularity that is different than the first resource granularity.

23. The method of claim 12, further comprising:
determining a resource granularity associated with the first PI field based on a common resource granularity associated with a first number of time units, or a second resource granularity that is associated with a second number of time units that is lower than the first number of time units,
wherein the determined resource granularity includes one of:
the first resource granularity whereby an entirety of the first PI field being common to both the first and second sets of T-F resources of the first and second BWPs, respectively are preempted,
a third resource granularity that is associated with the second number of time units whereby the first PI of the first PI field is associated with the second set of T-F resources of the second BWP and a second PI of the first PI field is associated with the first set of T-F resources of the first BWP.

24. A user equipment (UE), comprising:
means for receiving, in accordance with a frequency hopping scheme, data over a first set of time-frequency (T-F) resources of a first bandwidth part (BWP) and a second set of T-F resources of a second BWP for the UE, wherein the first BWP and the second BWP are associated with the same serving cell;
means for monitoring, over a third BWP that is different than the second BWP, a Physical Dedicated Control Channel (PDCCH) including a first Preemption Indication (PI) field with a first PI associated with the received data over the second set of T-F resources of the second BWP; and
means for processing the received data over the second set of T-F resources based on the first PI.

25. A base station configured as a serving cell of a user equipment (UE), comprising:
means for transmitting, to a user equipment (UE) in accordance with a frequency hopping scheme, data over a first set of time-frequency (T-F) resources of a first bandwidth part (BWP) and a second set of T-F resources of a second BWP for the UE; and
means for transmitting, to the UE over a third BWP that is different than the second BWP, a Physical Dedicated Control Channel (PDCCH) including a first Preemption Indication (PI) field with a first PI associated with the transmitted data over the second set of T-F resources of the second BWP.

26. A user equipment (UE), comprising:
a memory; and
at least one processor coupled to the memory and configured to:
receive, in accordance with a frequency hopping scheme, data over a first set of time-frequency (T-F) resources of a first bandwidth part (BWP) and a second set of T-F resources of a second BWP for the UE, wherein the first BWP and the second BWP are associated with the same serving cell;
monitor, over a third BWP that is different than the second BWP, a Physical Dedicated Control Channel (PDCCH) including a first Preemption Indication (PI) field with a first PI associated with the received data over the second set of T-F resources of the second BWP; and
process the received data over the second set of T-F resources based on the first PI.

27. A base station configured as a serving cell of a user equipment (UE), comprising:
a memory; and
at least one processor coupled to the memory and configured to:
transmit, to a user equipment (UE) in accordance with a frequency hopping scheme, data over a first set of time-frequency (T-F) resources of a first bandwidth part (BWP) and a second set of T-F resources of a second BWP for the UE; and
transmit, to the UE over a third BWP that is different than the second BWP, a Physical Dedicated Control Channel (PDCCH) including a first Preemption Indication (PI) field with a first PI associated with the transmitted data over the second set of T-F resources of the second BWP.

* * * * *